(12) United States Patent
Auerbach

(10) Patent No.: US 9,742,853 B2
(45) Date of Patent: Aug. 22, 2017

(54) DYNAMIC COMPUTER SYSTEMS AND USES THEREOF

(71) Applicant: Michael H. Auerbach, Rockville, MD (US)

(72) Inventor: Michael H. Auerbach, Rockville, MD (US)

(73) Assignee: The Michael Harrison Tretter Auerbach Trust, New York, NY (US)

( * ) Notice: Subject to any disclaimer, the term of this patent is extended or adjusted under 35 U.S.C. 154(b) by 177 days.

(21) Appl. No.: 14/512,442

(22) Filed: Oct. 12, 2014

(65) Prior Publication Data

US 2015/0334044 A1 Nov. 19, 2015

Related U.S. Application Data

(60) Provisional application No. 62/000,015, filed on May 19, 2014.

(51) Int. Cl.
*H04L 12/911* (2013.01)
*G06F 17/30* (2006.01)
(Continued)

(52) U.S. Cl.
CPC .......... *H04L 67/18* (2013.01); *G06F 17/3053* (2013.01); *H04L 12/6418* (2013.01);
(Continued)

(58) Field of Classification Search
CPC ....... H04L 67/306; H04L 67/42; H04L 47/78; H04L 67/18; H04L 12/6418; G06F 17/3053
(Continued)

(56) References Cited

U.S. PATENT DOCUMENTS 6,850,511 B2  2/2005 Kats et al.
7,002,944 B2  2/2006 Kats et al.
(Continued)

FOREIGN PATENT DOCUMENTS

EP         2151793       2/2010
WO    WO 2010/144766    12/2010
(Continued)

OTHER PUBLICATIONS

Ahtiainen, A. et al. (2009) "*Awareness Networking in Wireless Environments,*" Vehicular Technol. Mag. IEEE 4(3):48,54.
(Continued)

*Primary Examiner* — Kevin Bates
*Assistant Examiner* — Nazia Naoreen
(74) *Attorney, Agent, or Firm* — Jeffrey I. Auerbach; AuerbachSchrot LLC

(57) ABSTRACT

The invention concerns computer systems that are specially adapted to propagate content over a dynamic network, substantially in real time, by virtue of the locational proximity of network joined client computers. Preferably, the content will also be proximity-weighted, and more preferably also rank-weighted, topic-weighted, time-weighted, query-weighted, vote-weighted, and/or location-weighted. The invention particularly concerns such computer systems that employ more than one such weighting. The invention particularly concerns such computer systems that operate using, or through, mobile devices, particularly for distributed computing applications, including social media applications and communications applications conducted over Restricted Computer Networks.

22 Claims, 13 Drawing Sheets

(51) Int. Cl.
*H04L 29/08* (2006.01)
*H04L 29/06* (2006.01)
*H04L 12/64* (2006.01)

(52) U.S. Cl.
CPC .......... *H04L 47/783* (2013.01); *H04L 67/306* (2013.01); *H04L 67/42* (2013.01)

(58) Field of Classification Search
USPC ........................................................ 709/203
See application file for complete search history.

(56) References Cited

U.S. PATENT DOCUMENTS

| | | | |
|---|---|---|---|
| 7,496,293 B2 | 2/2009 | Shamir et al. | |
| 7,530,704 B2 | 5/2009 | Harris | |
| 7,598,849 B2 | 10/2009 | Gallant et al. | |
| 7,710,654 B2 | 5/2010 | Ashkenazi et al. | |
| 7,755,831 B2 | 7/2010 | Filipovich et al. | |
| 7,791,809 B2 | 9/2010 | Filipovich et al. | |
| 7,800,043 B2 | 9/2010 | Filipovich et al. | |
| 7,818,394 B1 | 10/2010 | Lawler et al. | |
| 7,831,684 B1 | 11/2010 | Lawler et al. | |
| 7,841,026 B2 | 11/2010 | Makris et al. | |
| 7,844,671 B1 | 11/2010 | Lawler et al. | |
| 7,949,611 B1 | 5/2011 | Nielsen et al. | |
| 8,073,807 B1 | 12/2011 | Srinivasaiah | |
| 8,091,032 B2 | 1/2012 | Fischer | |
| 8,108,414 B2 | 1/2012 | Stackpole | |
| 8,136,170 B2 | 3/2012 | DiPaola | |
| 8,138,991 B2 | 3/2012 | Rorberg et al. | |
| 8,145,637 B2 | 3/2012 | Ott, IV et al. | |
| 8,204,759 B2 | 6/2012 | Ashour et al. | |
| 8,219,500 B2 | 7/2012 | Galbreath et al. | |
| 8,224,727 B2 | 7/2012 | Hirson et al. | |
| 8,260,882 B2 | 9/2012 | Kim et al. | |
| 8,266,145 B2 | 9/2012 | Leung et al. | |
| 8,267,691 B1 | 9/2012 | Ferris et al. | |
| 8,269,159 B2 | 9/2012 | Filipovich et al. | |
| 8,306,921 B2 | 11/2012 | Kalik et al. | |
| 8,311,289 B2 | 11/2012 | Vanhoucke et al. | |
| 8,341,162 B2 | 12/2012 | Abercrombie, III et al. | |
| 8,355,610 B2 | 1/2013 | Simmonds | |
| 8,384,999 B1 | 2/2013 | Crosby et al. | |
| 8,407,282 B2 | 3/2013 | Cogan | |
| 8,431,881 B2 | 4/2013 | Filipovich et al. | |
| 8,436,788 B2 | 5/2013 | Kier et al. | |
| 8,467,133 B2 | 6/2013 | Miller | |
| 8,473,386 B2 | 6/2013 | Altberg et al. | |
| 8,473,500 B2 | 6/2013 | Baluja et al. | |
| 8,487,233 B2 | 7/2013 | Baudou et al. | |
| 8,489,516 B1 | 7/2013 | Nielsen et al. | |
| 8,495,095 B2 | 7/2013 | Nielsen et al. | |
| 8,504,507 B1 | 8/2013 | Srinivasaiah | |
| 8,510,383 B2 | 8/2013 | Hurley et al. | |
| 8,521,180 B2 | 8/2013 | Parish | |
| 8,531,418 B2 | 9/2013 | Nolting et al. | |
| 8,536,776 B2 | 9/2013 | Wood et al. | |
| 8,554,615 B2 * | 10/2013 | Biswas ................. | G06Q 30/02 705/14.38 |
| 8,554,868 B2 | 10/2013 | Skyrm et al. | |
| 8,560,939 B2 | 10/2013 | Wu et al. | |
| 8,566,605 B2 | 10/2013 | Rakshit et al. | |
| 8,570,990 B2 | 10/2013 | Kauffman | |
| 8,571,526 B2 | 10/2013 | Kass et al. | |
| 8,577,954 B2 | 11/2013 | Yoda et al. | |
| 8,582,502 B2 | 11/2013 | Conte | |
| 8,582,727 B2 | 11/2013 | Saylor et al. | |
| 8,583,781 B2 | 11/2013 | Raleigh | |
| 8,594,338 B2 | 11/2013 | Sinivaara | |
| 8,599,848 B2 | 12/2013 | Janneteau et al. | |
| 8,601,265 B2 | 12/2013 | Mane et al. | |
| 8,601,378 B2 | 12/2013 | Hickman | |
| 8,606,930 B1 | 12/2013 | Jain et al. | |
| 8,607,146 B2 | 12/2013 | Hickman | |
| 8,612,646 B2 | 12/2013 | Bartholomay et al. | |
| 8,612,869 B2 | 12/2013 | Tonse et al. | |
| 8,615,010 B1 | 12/2013 | Masters | |
| 8,619,822 B2 | 12/2013 | Munsell et al. | |
| 8,620,828 B1 | 12/2013 | Harrison, Jr. | |
| 8,625,544 B2 | 1/2014 | Kats et al. | |
| 8,630,867 B2 | 1/2014 | Yoo | |
| 8,635,499 B2 | 1/2014 | Cohn et al. | |
| 8,638,686 B2 | 1/2014 | Shihada et al. | |
| 8,647,207 B2 | 2/2014 | Abrink et al. | |
| 8,654,713 B2 | 2/2014 | Sugaya | |
| 8,656,421 B2 | 2/2014 | Tucker | |
| 8,662,386 B2 | 3/2014 | Radicella et al. | |
| 8,667,081 B2 | 3/2014 | Edecker et al. | |
| 8,670,414 B2 | 3/2014 | Nishida | |
| 8,671,188 B2 | 3/2014 | Bland et al. | |
| 8,671,202 B2 | 3/2014 | Deverick et al. | |
| 8,671,208 B2 | 3/2014 | Rozinov | |
| 8,676,165 B2 | 3/2014 | Cheng et al. | |
| 8,676,667 B1 | 3/2014 | Paiz | |
| 8,676,855 B2 | 3/2014 | Ushiyama | |
| 8,676,882 B2 | 3/2014 | Georgis et al. | |
| 8,676,925 B1 | 3/2014 | Liu et al. | |
| 8,676,934 B2 | 3/2014 | Takakura | |
| 8,677,017 B2 | 3/2014 | Xu et al. | |
| 8,677,418 B2 | 3/2014 | Wong | |
| 8,681,655 B2 | 3/2014 | Alam et al. | |
| 8,682,495 B2 | 3/2014 | Carralero et al. | |
| 8,683,551 B2 | 3/2014 | Pierer et al. | |
| 8,683,565 B2 | 3/2014 | Backlund | |
| 8,687,536 B2 | 4/2014 | Michaelis | |
| 8,688,038 B2 | 4/2014 | Byrne et al. | |
| 8,688,111 B2 | 4/2014 | Pan | |
| 8,688,779 B2 | 4/2014 | Bocking et al. | |
| 8,688,780 B2 | 4/2014 | Gordon et al. | |
| 8,688,789 B2 | 4/2014 | Katis et al. | |
| 8,688,801 B2 | 4/2014 | Issa | |
| 8,688,803 B2 | 4/2014 | Manion et al. | |
| 8,689,307 B2 | 4/2014 | Chaturvedi et al. | |
| 8,690,050 B2 | 4/2014 | Gazdzinski | |
| 8,690,381 B2 | 4/2014 | Yu | |
| 8,693,391 B2 | 4/2014 | Garcia-Martin et al. | |
| 8,693,392 B2 | 4/2014 | Cooper et al. | |
| 8,693,431 B2 | 4/2014 | Patil et al. | |
| 8,693,464 B2 | 4/2014 | Ku et al. | |
| 8,693,484 B2 | 4/2014 | Karaoguz et al. | |
| 8,693,982 B2 | 4/2014 | Alexander et al. | |
| 8,694,579 B2 | 4/2014 | Kurtenbach et al. | |
| 8,694,587 B2 | 4/2014 | Chaturvedi et al. | |
| 8,695,077 B1 | 4/2014 | Gerhard et al. | |
| 8,744,989 B1 * | 6/2014 | Westbrook ............. | G06Q 10/10 706/45 |
| 2009/0024457 A1 * | 1/2009 | Foroutan .......... | G06Q 10/06311 705/12 |
| 2009/0157473 A1 | 6/2009 | Belz et al. | |
| 2009/0157845 A1 | 6/2009 | Kim et al. | |
| 2009/0204600 A1 | 8/2009 | Kalik et al. | |
| 2009/0292549 A1 | 11/2009 | Ma et al. | |
| 2010/0036875 A1 | 2/2010 | Miezianko et al. | |
| 2010/0045705 A1 | 2/2010 | Vertegaal et al. | |
| 2010/0082618 A1 | 4/2010 | Ott, IV et al. | |
| 2010/0217660 A1 | 8/2010 | Biswas | |
| 2011/0066743 A1 | 3/2011 | Hurley et al. | |
| 2011/0131144 A1 | 6/2011 | Ashour et al. | |
| 2011/0196801 A1 | 8/2011 | Ellis et al. | |
| 2011/0238408 A1 | 9/2011 | Larcheveque et al. | |
| 2011/0238763 A1 | 9/2011 | Shin et al. | |
| 2011/0282793 A1 | 11/2011 | Mercuri et al. | |
| 2011/0288912 A1 | 11/2011 | McCrea et al. | |
| 2012/0084807 A1 | 4/2012 | Thompson et al. | |
| 2012/0084811 A1 | 4/2012 | Thompson et al. | |
| 2012/0124059 A1 | 5/2012 | Pratt et al. | |
| 2012/0136723 A1 | 5/2012 | Larner et al. | |
| 2013/0065526 A1 | 3/2013 | Pottier et al. | |
| 2013/0073473 A1 | 3/2013 | Heath | |
| 2013/0127748 A1 | 5/2013 | Vertegaal et al. | |
| 2013/0174223 A1 | 7/2013 | Dykeman et al. | |
| 2013/0182963 A1 | 7/2013 | Cok | |
| 2013/0218902 A1 | 8/2013 | Vendrow et al. | |
| 2013/0218967 A1 | 8/2013 | Chau et al. | |

(56) References Cited

U.S. PATENT DOCUMENTS

| | | |
|---|---|---|
| 2013/0267251 A1 | 10/2013 | Khorashadi et al. |
| 2014/0046955 A1 | 2/2014 | Dollard |
| 2014/0047357 A1 | 2/2014 | Alfaro et al. |
| 2014/0052281 A1 | 2/2014 | Eronen et al. |
| 2014/0052544 A1 | 2/2014 | Ta |
| 2014/0052795 A1 | 2/2014 | Ta |
| 2014/0053228 A1 | 2/2014 | Mahadevan et al. |
| 2015/0039404 A1* | 2/2015 | Richardson ............ G07C 13/00 705/12 |

FOREIGN PATENT DOCUMENTS

| | | |
|---|---|---|
| WO | WO 2011/005318 | 1/2011 |
| WO | WO 2011/021202 | 2/2011 |
| WO | WO 2011/097510 | 8/2011 |
| WO | WO 2011/119171 | 9/2011 |
| WO | WO 2013/052081 | 4/2013 |
| WO | WO 2014/055166 | 4/2014 |
| WO | WO 2014137382 | 9/2014 |
| WO | WO 2016/003541 | 1/2016 |

OTHER PUBLICATIONS

Bardala, V. et al. (2010) "*A Novel Learning Based Solution for Efficient Data Transport in Heterogeneous Wireless Networks,*" Wireless Networks 16(6):1777-1798.

Bellavista, P. et al. (2007) "*Context-Aware Handoff Middleware for Transparent Service Continuity in Wireless Networks,*" Pervasive and Mobile Computing 3(4):439-466.

Bellman, R. (1958). "*On a Routing Problem,*" Quarterly of Applied Mathematics 16:87-90; Ford, L.R., Jr. (1956) "*Network Flow Theory,*" Paper P-923. Santa Monica, California: RAND Corporation).

Broch, J. et al. (1998) "*A Performance Comparison of Multi-Hop Wireless Ad Hoc Network Routing Protocols,*" MobiCom '98 Proceedings of the 4$^{th}$ Annual ACM/IEEE Intl. Conf. on Mobile Computing and Networking, pp. 85-97.

Lamport, L. et al. (1982)"*The Byzantine Generals Problem,*" ACM Transactions on Programming Languages and Systems 4(3):382-401.

Lee, S.-B. et al. (2011) "*Content Management in a Mobile Ad Hoc Network: Beyond Opportunistic Strategy,*" UCLA CSD Technical Report: TR-110001 (pp. 1-10).

Lee, S.-B. et al. (2013) "*Content Management in a Mobile Ad Hoc Network: Beyond Opportunistic Strategy,*" Intl. J. Commun. Networks Distributed Syst. 10(2):123-145.

Li, D. et al. (2013) "*Opinion Impact Models and Opinion Consensus Methods in Ad Hoc Tactical Social Networks,*" Discrete Dynamics in Nature and Society (2013):Article ID 758079, pp. 1-6.

Li, J. et al. (2001) "*Capacity of Ad Hoc Wireless Networks,*" Proc. 7$^{th}$ ACM Intl. Conf. on Mobile Computing and Networking, Rome, Italy, Jul. 2001 (pp. 1-9).

Niazi, M. et al. (2009) "*Agent Based Tools for Modeling and Simulation of Self-Organization in Peer-to-Peer, Ad Hoc and Other Complex Networks, Feature Issue,*" IEEE Commun. Mag. 47(3):166-173.

Niazi, M. et al. (2011) "*Agent-Based Computing From Multi-Agent Systems to Agent-Based Models: A Visual Survey,*" Scientometrics 89(2):479-499.

Ramana, B.V. et al. (2008) "*A Novel Learning Based Solution for Efficient Data Transport in Heterogeneous Wireless Network,*" High Performance Computing—HiPC 2008 Lecture Notes in Computer Science 5374:402-414.

Steudi, P. et al. (2008) "*Demo Abstract Ad Hoc Social Networking using MAND,*" Proc. 14$^{th}$ Intl. Conf. on Mobile Computing and Networking (MobiCom '08) pp. 1-3.

PCT International Search Report, PCT/US15/30147 (WO 2016/003541) (2016); 3 pages.

PCT Written Opinion, PCT/US15/30147 (WO 2016/003541) (2016); 5 pages.

USPTO Official Action of Aug. 22, 2012 for U.S. Appl. No. 12/712,075 (6 pages).

Biswas Response to USPTO Official Action of Aug. 22, 2012 for U.S. Appl. No. 12/712,075 (Biswas) (12 pages).

MSU Technologies "*System and Methods for Profile-Aware Content Delivery Using Context-Induced Wireless Network Transport Mechanisms,*" http://msut.technologypublisher.com/technology/7029 (2011) (2 pages).

* cited by examiner

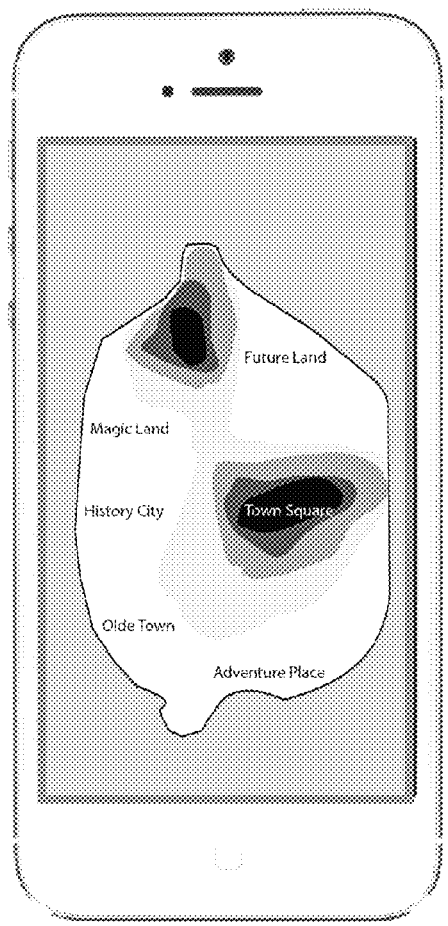 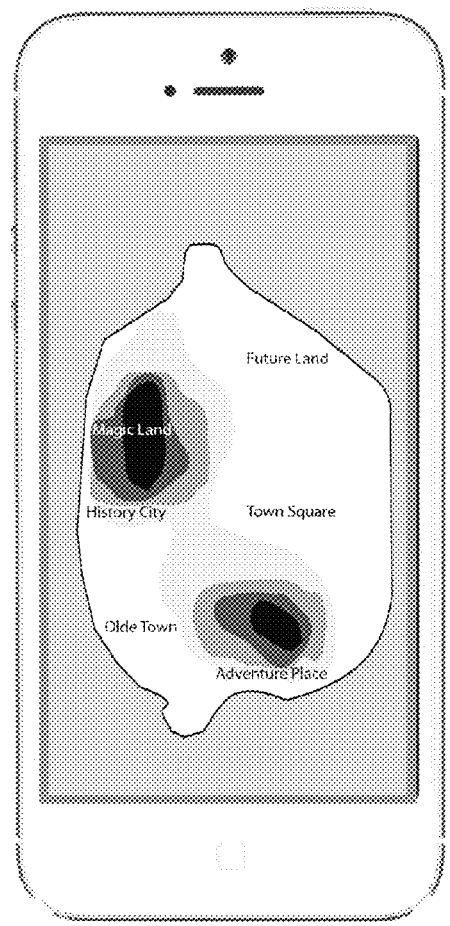
Figure 10A                    Figure 10B

DYNAMIC COMPUTER SYSTEMS AND USES THEREOF

CROSS-REFERENCE TO RELATED APPLICATIONS

This application claims priority to U.S. Patent Applications No. 62/000,015 (filed on May 19, 2014) and Ser. No. 14/512,442 (filed on Oct. 12, 2014), each of which applications is hereby herein incorporated by reference herein in its entirety.

BACKGROUND OF THE INVENTION

Field of the Invention

The invention concerns computer systems that are specially adapted to propagate content over a dynamic network, substantially in real time, by virtue of the locational proximity of network joined client computers. Preferably, the content will also be proximity-weighted, and more preferably also rank-weighted, topic-weighted, time-weighted, query-weighted, vote-weighted, and/or location-weighted. The invention particularly concerns such computer systems that employ more than one such weighting. The invention particularly concerns such computer systems that operate using, or through, mobile devices, particularly for distributed computing applications, including social media applications and communications applications conducted over Restricted Computer Networks.

Description of Related Art

Online social media services, such as social networking sites, search engines, news aggregators, blogs, and the like provide a rich environment for users to comment on events of interest and communicate with other users. Examples of social media services include: 43 Things®, Academia.edu®, Bebo®, Blauk, Blogster, Bolt.com, Buzznet®, CafeMom®, Care2®, CaringBridge®, Classmates.com®, CouchSurfing®, Diaspora*®, Eons.com, Experience Project, Exploroo, Facebook®, Faceparty®, Face.com®, Flixster®, Flickr®, Focus.com, Foursquare®, Friendica, Friends Reunited, Google+®, GovLoop®, Instagram®, Jaiku®, Lifeknot®, LinkedIn®, MEETin, Meetup®, MocoSpace®, MyHeritage®, MyLife®, My Opera®, Myspace®, Pinterest®, Plaxo®, ReverbNation.com, SocialVibe®, Spaces, Stage 32®, Stickam®, Talkbiznow, TravBuddy.com, Travellerspoint, tribe.net, Tumblr®, Twitter®, Vimeo®, Yammer®, and Yelp®.

Proximity analysis in social networking has been used in advertising and marketing, for example to permit merchants to more efficiently market their products and services to users (see, e.g., U.S. Pat. No. 8,306,921 and United States Patent Publications No. 2009/0157473; 2009/0204600; 2011/0196801; 2012/0084807; 2012/0084811 and 2012/0136723 and PCT Publications No. WO 2011/097510 and WO 2013/052081). Conversely, methods of sharing multimedia have been developed that measure the distance ("hop") between sending and receiving computers so as to provide a measure of the level of interest in such by the members of the social network (with multimedia having greater hop-distance being indicative of a higher level of interest) (see, e.g., U.S. Pat. No. 8,260,882 and United States Patent Publication No. 2009/0157845). Proximity analysis has been proposed as a means for providing enhanced security surveillance (see, e.g., United States Patent Publications No. 2009/0292549 and 2010/0036875). Methods of information sharing associated with an event location are disclosed in U.S. Pat. Nos. 8,204,759 and 8,510,383 and in United States Patent Publications No. 2011/0066743 and 2011/0131144. Social networks in which participants seek help or the performance of other in the user's vicinity are described in United States Patent Publications No 2011/0238763 and 2011/0282793.

Content recommendation systems allowing users to identify friends, or recommend content or activities to friends, in their present or planned future geographic locations have been described (see, e.g., U.S. Pat. No. 8,108,414 and United States Patent Publication No. 2011/0288912; 2012/0124059; 2013/0218967; 2013/0267251 and 2014/0047357; and PCT Publication No. WO 2013/126293).

Examples of computer system architecture for social networks or for location determination are described in U.S. Pat. Nos. 7,818,394; 7,831,684; 7,844,671; 7,949,611; 8,073,807; 8,108,414; 8,219,500; 8,224,727; 8,266,145; 8,311,289; 8,341,162; 8,407,282; 8,473,386; 8,473,500; 8,489,516; 8,495,095; 8,504,507; 8,521,180; 8,554,868; 8,566,605; 8,601,378; 8,607,146; 8,612,869 and 8,620,828 and in United States Patent Publications No. 2014/0052544; 2014/0052795 and US 2013/0073473 and in European Patent Publication EP 2151793 and in PCT Publications No. WO 2013/154679; WO 2013/170082; WO 2013/181662; WO 2013/184407 and WO 2013/184957. In particular, such computer system architecture may have a server-centered architecture (e.g., U.S. Pat. Nos. 8,676,667; 8,695,077; 8,694,579; 8,693,982; 8,693,464; 8,683,565; 8,670,414; 8,677,418; 8,676,934; 8,667,081; 8,662,386; 8,656,421; 8,647,207; 8,635,499; 8,630,867; 8,599,848; 8,601,265; 8,606,930; 8,615,010; 8,612,646; 8,619,822; 8,583,781; 8,577,954; 8,582,727; 8,560,939; 8,571,526; etc.) or a peer-to-peer architecture (e.g., U.S. Pat. Nos. 8,694,587; 8,693,484; 8,693,431; 8,693,392; 8,693,391; 8,690,050; 8,689,307; 8,688,803; 8,688,801; 8,688,789; 8,688,780; 8,688,779; 8,688,111; 8,688,038; 8,687,536; 8,683,551; 8,682,495; 8,677,017; 8,676,925; 8,676,882; 8,676,855; 8,676,165; 8,671,208; 8,671,202; 8,671,188; etc.).

Methods of searching, sorting and grouping data and of displaying data on computers and mobile devices in response to user-defined criteria have also been described (see, e.g., European Patent Publications No. EP 2441039; EP 2452247 and EP 2569716; U.S. Pat. Nos. 8,091,032 and 8,145,637 and United States Patent Publications No. 2010/0045705; 2010/0082618; 2011/0238408; 2013/0127748; 2013/0182963; 2013/0218902; 2014/0046955; 2014/0052281 and 2014/0053228 and PCT Publications No. WO 2010/144766; WO 2011/005318; WO 2011/119171 and WO 2011/021202).

Despite all such advances, a need remains for computer systems that are specially adapted to propagate content over a dynamic network, substantially in real time, by virtue of the locational proximity of network joined client computers. The invention is directed to this and other needs.

SUMMARY OF THE INVENTION

The invention concerns computer systems that are specially adapted to propagate content over a dynamic network, substantially in real time, by virtue of the locational proximity of network joined client computers. Preferably, the content will also be proximity-weighted, and more preferably also rank-weighted, topic-weighted, time-weighted, query-weighted, vote-weighted, and/or location-weighted. The invention particularly concerns such computer systems that employ more than one such weighting. The invention particularly concerns such computer systems that operate using, or through, mobile devices, particularly for distributed computing applications, including social media applications and communications applications conducted over Restricted Computer Networks.

In detail, the invention provides a computer system for disseminating content among interconnected client computers, wherein the computer system comprises three or more client computers digitally interconnected with one another to form a distributed communications network, wherein, (A) each of the interconnected client computers comprises: a means for inputting data, a means for receiving content provided by another client computer, a means for providing content to another client computer, a computer-addressable memory for storing content and programming instructions, and a processor for processing data and for implementing the programming instructions;

(B) the client computers are interconnected to one another directly or through one or more other client computers; and (C) each of the interconnected client computers receives content from and/or provides content to another of the interconnected client computers, thereby disseminating such content across the distributed network.

The invention additionally concerns such a computer system, wherein a client computer of the computer system stores received content in a Content Stack memory; wherein content stored in the Content Stack memory rises in response to increases in Favorability Value of the content, and falls in the Content Stack memory in response to decreases in Favorability Value, wherein the Favorability Value is determined by a Favorability Function that considers client-selected or network-selected Favorability Parameters, such that the number or amount of content stored in the Content Stack memory and provided to other client computers of the network remains within available processing and bandwidth parameters.

The invention additionally concerns such a computer system, wherein the client computer of the computer system presents a subset of the stored content to its user, wherein the presented content is stored in a Presentation Stack memory; wherein content stored in the Presentation Stack memory:

(A) rises in the Presentation Stack memory in response to:
 (1) increased proximity between the content-receiving client computer and a content-providing client computer that is providing such content;
 (2) increases in the Favorability Value of the content; and
 (3) changes in the weighting preferences applied by the content-receiving client computer that increase the user's desire for such content; and (B) falls in the Presentation Stack memory in response to:
 (1) decreased proximity between the content-receiving client computer and a content-providing client computer that is providing such content;
 (2) decreases in the Favorability Value of the content; and
 (3) changes in the weighting preferences applied by the content-receiving client computer that decrease the user's desire for such content; such that the number or amount of content stored in the Presentation Stack memory of the client computer remains within user-selected parameters.

The invention additionally concerns any of such computer system, wherein the client-selected or network-selected Favorability Parameters comprise one or more of the Favorability Parameters: vote, dissemination, distance, hop-distance, time and premium.

The invention additionally concerns a computer-implemented method for disseminating content among interconnected client computers, wherein the method comprises:

(A) digitally interconnecting three or more client computers via a distributed communications network to form a computer system, wherein,
 (1) each of the interconnected client computers comprises: a means for inputting data, a means for receiving content provided by another client computer, a means for providing content to another client computer, a computer-addressable memory for storing content and programming instructions, and a processor for processing data and for implementing the programming instructions;
 (2) wherein the client computers are interconnected to one another directly or through one or more other client computers, so that content received from, and/or provided to, another of the interconnected client computers is provided to all other interconnected client computers of the distributed network;

(B) providing content to one of the interconnected client computers, and permitting the distributed network of client computers to disseminate such content across the network.

The invention additionally concerns such a computer-implemented method, wherein a client computer of the computer system stores received content in a Content Stack memory; wherein content stored in the Content Stack memory rises in response to increases in Favorability Value of the content, and falls in the Content Stack memory in response to decreases in Favorability Value, wherein the Favorability Value is determined by a Favorability Function that considers client-selected or network-selected Favorability Parameters, such that the number or amount of content stored in the Content Stack memory and provided to other client computers of the network remains within available processing and bandwidth parameters.

The invention additionally concerns such a computer-implemented method, wherein the client computer of the computer system presents a subset of the stored content to its user, wherein the presented content is stored in a Presentation Stack memory; wherein content stored in the Presentation Stack memory:

(A) rises in the Presentation Stack memory in response to:
 (1) increased proximity between the content-receiving client computer and a content-providing client computer that is providing such content;
 (2) increases in the Favorability Value of the content; and
 (3) changes in the weighting preferences applied by the content-receiving client computer that increase the user's desire for such content; and (B) falls in the Presentation Stack memory in response to:
 (1) decreased proximity between the content-receiving client computer and a content-providing client computer that is providing such content;
 (2) decreases in the Favorability Value of the content; and
 (3) changes in the weighting preferences applied by the content-receiving client computer that decrease the user's desire for such content; such that the number or amount of content stored in the Presentation Stack memory of the client computer remains within user-selected parameters.

The invention additionally concerns any of such computer-implemented method, wherein the client-selected or network-selected Favorability Parameters comprise a Favorability Parameter selected from the group consisting of: vote, dissemination, distance, hop-distance, time and premium.

The invention additionally concerns such computer systems or such computer-implemented methods, wherein the client-selected or network-selected Favorability Parameters comprise two or more, three or more, four or more, or five or more of the above-recited Favorability Parameters.

The invention additionally concerns such computer systems or such computer-implemented methods, wherein the client-selected or network-selected Favorability Parameters comprise the Favorability Parameters: distance and time.

The invention additionally concerns any such computer system or any such computer-implemented method, wherein the presented content is weighted based on a weighting selected from the group consisting of: rank-weighting, topic-weighting, time-weighing, query-weighting, vote-weighting and location-weighting.

The invention additionally concerns any such computer systems or any such computer-implemented methods, wherein the presented content is weighted based on more than one weighting, wherein at least one of such additional weightings is selected from the group consisting of: rank-weighting, topic-weighting, time-weighing, query-weighting, vote-weighting and location-weighting.

The invention additionally concerns such computer systems or such computer-implemented methods, wherein a client computer of the computer system votes to favor or disfavor a received content, or provides related content, and provides the vote or the related content to another client computer.

The invention additionally concerns such computer systems or such computer-implemented methods, wherein the network additionally comprises a Content Monitoring Client Computer.

The invention additionally concerns such computer systems or such computer-implemented methods, wherein the network comprises a Restricted Computer Network.

BRIEF DESCRIPTION OF THE DRAWINGS

FIG. 9A shows the use of a sorting graphical element to group content for presentation to a user. FIG. 9B shows the use of a drag and drop capability to group content for presentation to a user. FIG. 9C shows the use of a graphical element selection capability to group content for presentation to a user.

FIGS. 10A-10B illustrate the ability of the invention to use location-weighting to form "heat maps" of recent activity (FIG. 10A) and rank activity (FIG. 10B).

DETAILED DESCRIPTION OF THE INVENTION

Figure 1:
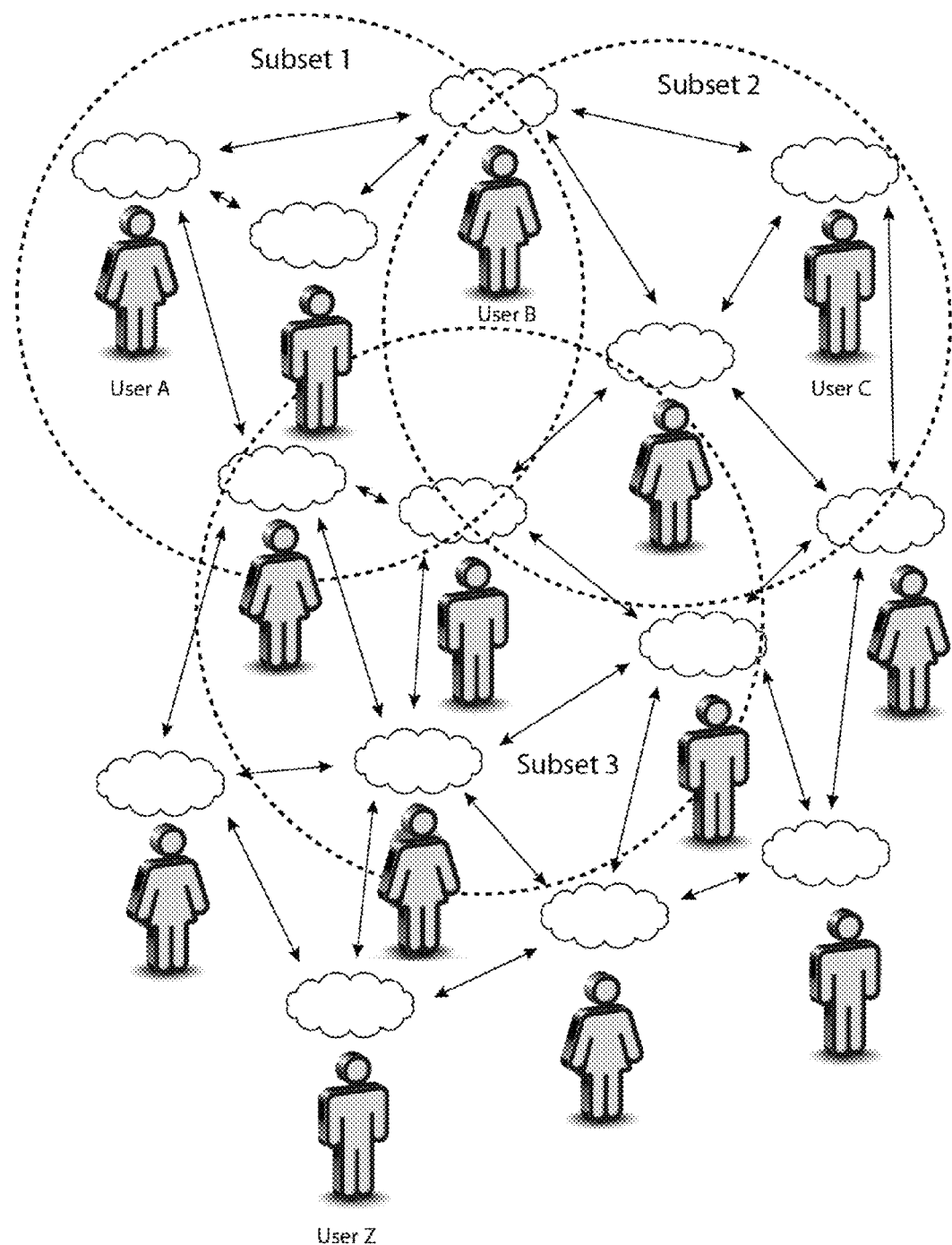
FIG. 1 shows a map of interconnected client computers of a distributed computer system of the present invention.

The invention concerns computer systems that are specially adapted to propagate content over a dynamic network, substantially in real time, by virtue of the locational proximity of network joined client computers. Preferably, the content will also be proximity-weighted, and more preferably also rank-weighted, topic-weighted, time-weighted, query-weighted, vote-weighted, and/or location-weighted. The invention particularly concerns such computer systems that employ more than one such weighting. The invention particularly concerns such computer systems that operate using, or through, mobile devices, particularly for distributed computing applications, including social media applications and communications applications conducted over Restricted Computer Networks.

I. The Preferred Computers of the Computer Systems of the Present Invention

The preferred computers of the computer systems of the present invention are "client computers" (also referred to herein as "clients") that will preferably possess a means for inputting data, means for receiving and providing data to other interconnected client computers (clients) of the network, computer (or machine)-addressable memory configured to store content and/or to store programming instructions, and a computer "processor" configured to process data (including content) and to implement programming instructions.

The programming instructions stored in a client computer (or otherwise provided to such client computer) enables that client computer to provide content to other client computers of a common network (acting as a distributed server), to receive content provided from other client computer(s) of the common network, and, preferably, to store (permanently, transiently, or for a user-set time duration) content provided from other client computers that are joined to such network. The programming instructions may be a computer "App," a firmware program, a computer program stored in memory, etc.). Alternatively, the client computer may join and participate with a computer system of the present invention by accessing a website, LAN, WLAN, etc. that communicates with a server.

Additionally, the programming instructions enables a client computer to determine the "proximity" between such client computer and other client computer(s) of a common network, based upon the locational position of such client computer and the locational position of such other client computer(s). Locational information may be input manually (as through an "app" or input interface), but more preferably will be determined automatically by the client computer (e.g., using an internal or external global positioning system (GPS) receiver, or with reference to cellular signaling towers, or with reference to a fixed land-based internet access point, etc.). Preferably, the set of instructions stored in the client enables such client to establish a searchable and/or sortable database of received content. The establishment of such a database enables each client to independently and dynamically present to its user content that is weighted by proximity, and also by topic ranking, topic keyword, time or location of interest.

Preferably, such client computers will also have an output or presentation capability (e.g., a video output (e.g., an LCD or LED screen, etc.), and/or an audio output (e.g., a speaker, tone generator, etc.) so as to enable a user of a client computer to perceive provided or received content. The invention, however, encompasses client computers that lack such output capability (for example, client computers mounted in vehicles, structures (e.g., towers), or on drones, aircraft, watercraft, etc., whose purpose is to extend the communication range of a computer network formed by a computer system of the present invention. Such client computers may have output capabilities, however, such the possession of such capabilities by such client computers is optional.

The client computers of the present invention will preferably be mobile devices, such as smartphones, laptops, tablets, smartwatches (e.g., Moto 360®), optical head-mounted display (OHMD) (e.g., Google Glass®, Oculus Rift® (Oculus/Facebook Corporation), helmet visors, night vision goggles, vehicular heads-up displays, etc.; see, e.g., U.S. Pat. Nos. 8,594,338; 8,536,776; 8,531,418; 8,487,233; 8,467,133; 8,436,788; 8,431,881; 8,384,999; 8,355,610; 8,269,159; 8,267,691; 8,138,991; 8,136,170; 7,841,026; 7,800,043; 7,791,809; 7,755,831; 7,710,654; 7,598,849; 7,530,704; 7,496,293; etc.). Although particularly adapted for use with inter-communicating mobile devices, the client computers of the computer systems of the present invention may comprise any form of computer (including stationary desktop computers and servers). The communication range of the client computers of the present invention may be up to 50 feet, up to 100 feet, up to 250 feet, up to 500 feet, up to 0.25 miles, up to 0.5 miles, up to 1 mile, up to 2 miles, up to 5 miles, up to 10 mile, up to 20 miles, up to 50 miles, up to 100 miles, or more than 100 miles.

The users of the client computers of the present invention may be unrelated individuals, groups or entities (such as people visiting a park, groups from different organizations, stores, businesses, etc.). Alternatively, the users of the client computers of the present invention may be related individuals, groups or entities (such as medical, security, fire or emergency personnel responding to an accident or other incident, or military personnel engaged in a joint activity). For example, emergency or other personnel responding to an incident (e.g., a burning building, etc.) could use the present invention to remain in communication with one another automatically (and particularly, have the ability to automatically communicate with other responders located near to them). Alternatively, as indicated above, the client computers may be installed in vehicles, structures (e.g., towers), drones, etc., and may be unattended by any user.

II. Content Sharing by the Client Computers of the Computer Systems of the Present Invention As indicated above, the computer systems of the present invention are preferably composed of two or more client computers that are digitally interconnected and which thus form a communication network capable of providing "content" to, and of receiving "content" from other client computers that are joined to the network (collectively, referred to as "sharing" content).

As used herein, the term "content" is intended to include a digital or analog communication relevant to a particular "topic" (i.e., subject, event, name, etc.). Each topic may have one or more subtopics ("threads"). Content is said to be "related" if it pertains to, is about, or relates to the same topic.

The term "content" may thus comprise one, or any combination, of:

A. text (e.g., a comment, opinion, remark, response, vote, text message, symbol, letter, emoticon, etc.), provided, for example in an ASCII, UTF-8, MIME, TXT, or other text character file. Such textual message content will preferably comprise brief textual messages (e.g., a textual message having no more than 500 characters (i.e., letters, symbols, emoticons, etc.), no more than 300 characters, no more than 200 characters, no more than 150 characters, or most preferably, no more than 100 characters;

B. sound (e.g., a voice recording, song, music, tone, musical note, sound effect, street sound, etc.), provided, for example in a 3gp, aac, act, AIFF, ALAC, amr, atrac (.wav), Au, awb, dct, dss, dvf, flac, gsm, iklax, IVS, m4a, m4p, mmf, mp3, mpc, msv, ogg, Opus, ra & rm, raw, vox, way, wavpack, wma, or other type of audio file;

C. image (e.g., a pixel-based image, a vector image, a photograph, a holograph, a virtual reality image, a 3D image, etc.) provided, for example in a JPEG/JFIF, JPEG 2000, Exif, TIFF, RAW, GIF, BMP, PNG, PPM, PGM, PBM, PNM, PFM, PAM, WEBP, an HDR Raster format, RGBE, IFF-RGFX, JPEG XR (New JPEG standard based on Microsoft HD Photo), TGA (TARGA), ILBM (IFF-style format for up to 32 bit in planar representation, plus optional 64 bit extensions, DEEP (IFF-style), AI, IMG (Graphical Environment Manager image file; planar, run-length encoded), PCX (Personal Computer eXchange), ECW (Enhanced Compression Wavelet), IMG (ERDAS IMAGINE Image), SID (multiresolution seamless image database, MrSID), CD5 (Chasys Draw Image), FITS (Flexible Image Transport System), PGF (Progressive Graphics File), XCF (eXperimental Computing Facility format, native GIMP format), PSD (Adobe PhotoShop Document), PSP (Corel Paint Shop Pro), VICAR file format (NASA/JPL image transport format), HVD (Holographic Versatile Disc), 3DM, 3DS, MAX 3DS, OBJ, A2C, B3D, BLEND, BR5, BR6, CCP, CG, CGFX, CHR, DAE, DAZ, DSF, DWF, FACEFX, FBX, FLT, FPF, IV, LND 3D, LWO, LWS, LXO, MA, MB, MDD, MXS, SDB, SHP, SKP, STP, U3D, VUE, PDF or other image file; or D. video (e.g., a moving image, a video image, movie, etc.) provided, for example in a 3GP, ASF, AVI, RIFF, DVR-MS, Flash Video (FLV, F4V), IFF (first platform-independent container format), Matroska (MKV), MJ2, QuickTime, MPEG (including MPEG-1, MPEG-2, MPEG-TS and MPEG-4 Part 12), MP4, JPEG 2000 Part 12, Ogg, RM (RealMedia), vrcinema3D, or other video file.

Preferably, such text, sound, image or video files will be less than 1 GB, less than 500 MB, less than less than 200 MB, less than 100 MB, less than 50 MB, less than 20 MB, less than 10 MB, less than 5 MB, less than 2 MB, less than 1 MB, less than 500 KB, less than 200 KB, less than 100 KB, less than 50 KB, less than 20 KB, or less than 10 KB in size.

As stated above, a computer of a computer system of the present invention has the ability to receive content from other computers of the computer system, and preferably also has the ability to provide content to such other computers (i.e., the ability to "share content"). As used herein, the term "receive content" denotes the capacity of a client computer to accept, employ or otherwise access, by any means, content that has been provided by another client computer of a computer system of the present invention. As used herein, the term "provide content" denotes the capacity to transmit, transfer, relay, broadcast, or otherwise disseminate or distribute content, by any means, so that content provided by one client computer is, or may be made, accessible to other client computers of a computer system of the present invention. Such receiving and providing capabilities permit the dissemination of content by and among client computers. Additionally, such receiving and providing capabilities may be used to permit servers or Content Monitoring Client Computers (as discussed below) to conduct content datamining, or to perform content backups for client computers (e.g., continuously, automatically at periodic intervals, or manually upon the request of the user of such client computer). Such content backups may be desirable in order to restore unsaved content if the client computer exits the network. Additionally, such receiving and providing capabilities can be used to permit servers or Content Monitoring Client Computers or client computers to obtain a log of accessed content.

Most preferably, client computers will be directed to present content to its user. As used herein, the term "present" content denotes displaying content (for example, in the case of content involving textual, image or video content, displaying such content on a screen, projection or other visible output) or performing or playing content (for example, in the case of content involving sound). Preferably, such content will be provided in "real time" (i.e., with sufficient immediacy as to provide such content to a recipient client at substantially the same actual time at which such content was provided by the providing client). Alternatively, in an embodiment in which content is stored (for example, when a non-distributed computer system having a centralized server is used), historical content can be provided, permitting a user to perceive content that had been provided at an earlier time, or during a user-selected time period in the past).

As discussed below, client computers may be required to obtain permission or authorization to join a network of the present invention, and may require additional permission or authorization before being able to provide content to other clients of a network. More preferably, however, a client computer will join to a network of a computer system of the present invention automatically upon recognizing the presence of a second client computer, without any need for the granting of permission from such client computer or from other client computers of such computer system. Although client computers of a computer system of the present invention may be directed to provide the names or usernames of their respective users to other client computers, it is preferred that a user's participation in a common network be anonymous to other users. To facilitate comprehension of content discussions, a client computer may ascribe a transient token name to content contributors. Thus, for example, the first user to contribute content may be identified as "Anon01," and the second user to contribute related content may be identified as "Anon02," etc. In such a manner, users corresponding to "Anon01" and "Anon02" may converse with one another anonymously.

III. Preferred Network Configurations of the Computer Systems of the Present Invention As indicated above, the computer systems of the present invention comprise two or more client computers that have been "joined to a network" and are thus digitally interconnected with one another. Two or more client computers that are joined to the same network are referred to herein as being joined to a "common" network.

The communication networks of the present invention may be of any type and may have any form of network architecture, including any of the following: a point to point network, a broadcast network, a wide area network, a local area network, a telecommunications network, a data communication network, a computer network, an ATM (Asynchronous Transfer Mode) network, a SONET (Synchronous Optical Network) network, a switched fabric network (e.g., an INFINIBAND® switched fabric network), a SDH (Synchronous Digital Hierarchy) network, a wireless network, and a wireline network. The networks of the present invention may include a wireless link, such as an infrared channel, a radio frequency, or a satellite band, or may comprise, or include wired (e.g., Ethernet, fiber optic, etc.) connections or non-wired connections (e.g., laser pulses, etc.). The network may have any topology (e.g., a bus, star, or ring topology, etc.).

The computer systems of the present invention may be of any topology known to those ordinarily skilled in the art as being capable of supporting the operations described herein. Connections and networks included in the connections may comprise the internet, local networks, web servers, file servers, routers, databases, computers, servers, network appliances, cell phones or any other computing devices capable of sending and receiving data, especially digital data. The computer systems of the present invention may comprise computing devices connected via cables, IR ports, wireless signals, or any other means of connecting multiple computing devices. The individual computers of the computer systems of the present invention may communicate with one another via any communication protocol used to communicate among or within computing devices, including without limitation radio frequency, Bluetooth, SSL, HTML, XML, RDP, ICA, FTP, HTTP, TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEE 802.11b, IEEE 802.11g, IEEE 802.11n, and direct asynchronous connections, or any combination thereof. Most preferably, a client computer of the present invention will join to a network wirelessly and participate in content sharing with other client computers of the present invention utilizing any protocol or protocols used to communicate among mobile devices, including AMPS, TDMA, CDMA, GSM, EDGE, GPRS or UMTS.

The networks of the present invention may be either "non-distributed networks" or "distributed networks." In the "non-distributed networks" of the present invention, client computers provide content to a centralized computer (such as a server), and receive content from the centralized server. Individual client computers play no role in disseminating content; such dissemination is accomplished when other client computers access the centralized computer and receive provided content from the centralized computer. In contrast, in the "distributed networks" of the present invention, each client computer joined to the network mediates the dissemination of received content to all other client computers joined to that network (and more preferably to all other client computers joined to any network) that are within communication range, preferably without any gateway node. The dissemination of content by the distributed networks of the present invention is accomplished by having a receiving client computer re-provide such content to such other client computers. Thus, in a non-distributed network of the present invention, content flows from client computers to a centralized computer and then from the centralized computer to other client computers and the virtual proximity of client computers (i.e., their connectivity to the same central computer) determines their ability to share content. In the distributed networks of the present invention, content flows across the network by "hopping" from one client computer to another, preferably without any gateway node, and the locational proximity of client computers determines their ability to share content. Distributed networks are the preferred networks of the present invention.

Distributed networks have been previously described in the context of "ad hoc" or "mesh" networks (see generally, Ahtiainen, A. et al. (2009) "*Awareness Networking In Wireless Environments*," Vehicular Technol. Mag. IEEE 4(3):48, 54; Li, J. et al. (2001) "*Capacity of Ad Hoc Wireless Networks*," Proc. 7$^{th}$ ACM Intl. Conf. on Mobile Computing and Networking, Rome, Italy, July 2001 (1-9); Broch, J. et al. (1998) "*A Performance Comparison Of Multi-Hop Wireless Ad Hoc Network Routing Protocols*," MobiCom '98 Proceedings of the 4$^{th}$ Annual ACM/IEEE Intl. Conf. on Mobile Computing and Networking, pages 85-97; Niazi, M. et al. (2009). "*Agent based Tools for Modeling and Simulation of Self-Organization in Peer-to-Peer, Ad Hoc and other Complex Networks, Feature Issue*," IEEE Commun. Mag. 47(3):163-173; Lee, S.-B. et al. (2013) "*Content Management In A Mobile Ad Hoc Network: Beyond Opportunistic Strategy*," Intl. J. Commun. Networks Distributed Syst. 10(2):123-145; Steudi, P. et al. (2008) "*Demo Abstract Ad Hoc Social Networking using MAND*," Proc. 14$^{th}$ Intl. Conf. on Mobile Computing and Networking (MobiCom '08) pp. 1-3; Li, D. et al. (2013) "*Opinion Impact Models and Opinion Consensus Methods in Ad Hoc Tactical Social Networks*," Discrete Dynamics in Nature and Society (2013):Article ID 758079, pp. 1-6). However, the utility of such prior networks has not been fully established. Network flow has been deemed to be limited because the throughput available to each single node's applications is limited by the forwarding load imposed by distant nodes (Li, J. et al. (2001) "*Capacity of Ad Hoc Wireless Networks*," Proc. 7$^{th}$ ACM Intl. Conf. on Mobile Computing and Networking, Rome, Italy, July 2001 (1-9)). To address network flow issues, previously described ad hoc or mesh networks are configured to contain gateway nodes (see, e.g., U.S. Pat. Nos. 8,570,990; 8,690,381; 8,654,713; 8,681,655 and 8,638,686), or may restrict the ability of nodes to send data in real time (see, e.g., U.S. Pat. Nos. 6,850,511; 7,002,944; and 8,625,544), or may involve specific packet routing protocols (see, e.g., U.S. Pat. No. 8,582,502) or involve other restrictions.

A. Operation of a Preferred Distributed Network of the Present Invention

As described above, the client computers of the computer system of the present invention preferably form a distributed network in which content, provided from one client computer, is received by a second client computer, and provided from such second client computer to additional client computers, such that a network map comprises sets of client computer nodes that are each in communication with interlocking subsets of the client computers of the distributed network, in which the area covered by a particular subset reflects the communication range of the client computers (FIG. 1). FIG. 1 shows a map of interconnected client computers; for simplicity of illustration only three subsets of client computers are shown (dashed circles). As will be appreciated, however, each client computer serves as the node of a subset, such that a large number of interlocking subsets may be formed. Client computers within a particular subset (e.g., the client computers of User A and User B in Subset 1, or the client computers of User B and User C in Subset 2) are capable of providing and receiving content to/from one another. Thus, although User C is "out of range" of User A, the invention permits User C and User A to nevertheless share content with one another, through the client computer of User B. User B is within both Subset 1 and Subset 2, and is thus in range of both User A and User C. Likewise, the distributed network formed by the present invention permits content to be exchanged and shared among all members of a network, even those located most distant from one another (e.g., User A and User Z).

This aspect of the present invention permits its distributed network to be "dynamic." The distributed network dynamically and automatically adjusts to continue to provide content to the clients of the network. For example, in FIG. 1, the client computers of User A and User C are able to share content with one another, through the client computer of User B. However, if User A were to move to be next to User Z, he would, throughout such journey, be continuously able to maintain content sharing with User C, through the client computers of other users. Indeed, within the communication range of their respective client computers, all of the users shown in FIG. 1 could move about freely without altering their content sharing ability or the content sharing abilities of any other user. Provided that at least one client computer is within communication range of another client computer, the "coverage" of their common network can dynamically grow, alter or migrate in response to changes in the locational positions of all other client computers. Thus, a salient benefit of the distributed networks of the present invention is that content provided by a user traverses across the entire network ("content flow") so as to be accessible to all other users of the network.

Users may elect to not perceive particular content, or they may elect to view content relevant to topics of interest. However, because the selected content is stochastic and is carried in the network flow for content that a user has selected as being of interest, any responding content creates a potential for a "data race." The occurrence of a data race reflects the capability that the present invention provides for client computers to "weight" received content. Users may thus "vote" to promote or disfavor a content that is received on their client computers, which then sends a message to other client computers, updating the vote value of such content.

Figure 2:
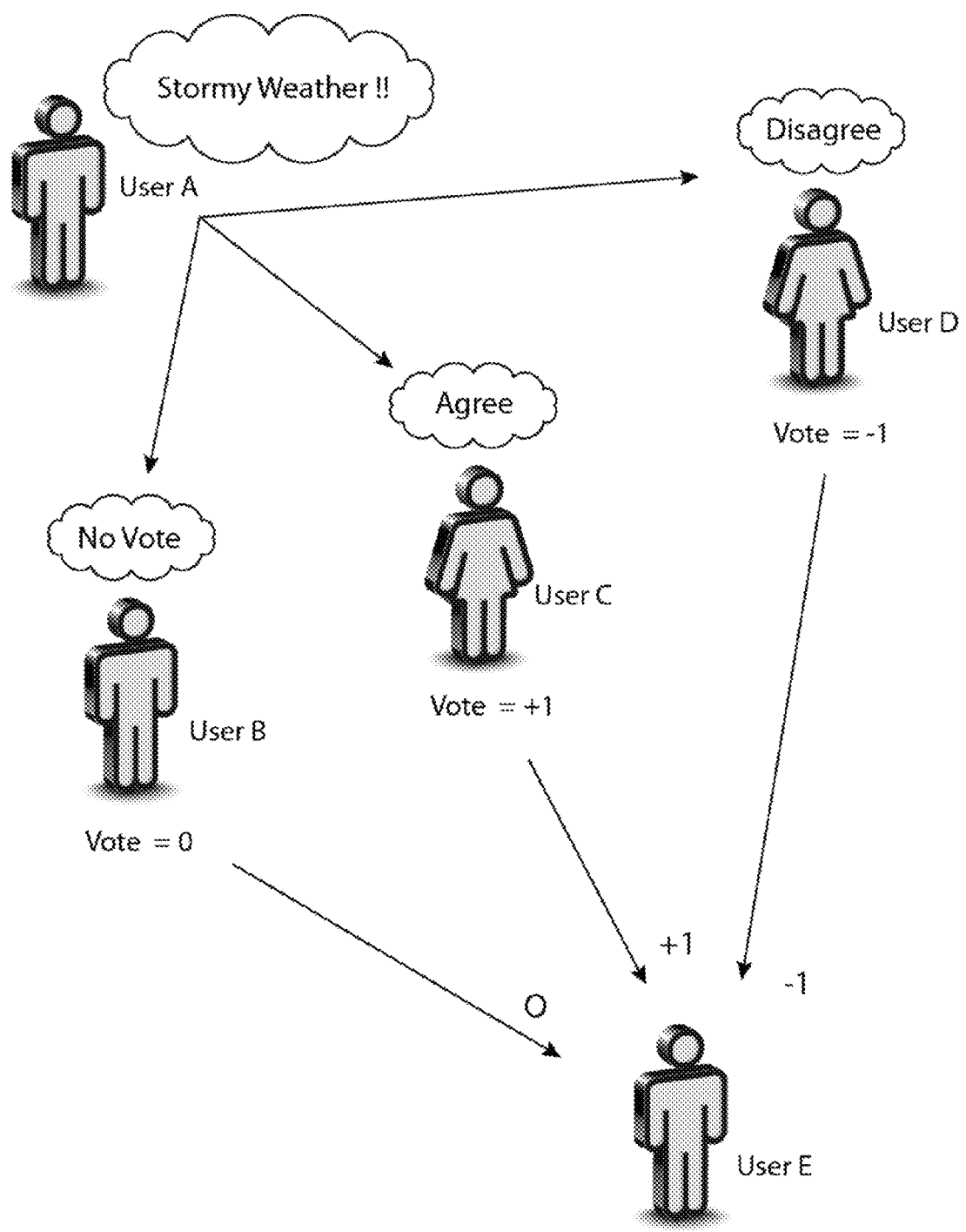
FIG. 2 illustrates a data race.

As a consequence, a subsequent user may receive conflicting data with which to weight content (FIG. 2). FIG. 2 illustrates a data race. As shown in FIG. 2, User A provides content to the network. The content is received by Users B, C and D, who each vote (passively, in the case of User B, and actively, in the case of Users C and D). Client computers of all three users provide content to User D. In a data race, the first client computer to provide content to User D's client computer sets the weighting for the content. A data race may also result from the provision of dual (or multiple) versions of content that has developed discrepancies in the course of being routed over the network. For example, the same content may be provided to other client computers of the network (as it is being routed from one client computer to another across the network). A client computer may therefore, for example, receive content having n votes from one client computer, and the same content, but with m votes, from a different client computer.

A data race is not a desired means of distributing content across the networks of the present invention. To address and resolve such data race issues, it is preferred for each client computer (and/or each user) to have a unique identifier coding. Preferably, each content provided to the network will also have a unique identifier coding. Preferably, therefore, when a user votes to promote or disfavor a particular content, the identifier coding of the user or client computer is attached to the comment, and saved on the user's client computer. When "duplicate" versions of a content are received, or when votes regarding such content is received, the user's client computer takes the union of the data, such that a new version is created consisting of the content and the union of votes (by user or client computer identifier coding) between the incoming vs. existing versions of the comment). This new version is then provided to other client computers, and the process repeats (until the content "dies" from lack of vote or distributing client computers). Thus, in the data race scenario of FIG. 2, the User D client computer will take the union of the incoming votes in order to determine the weighting to be used by User D, and to be propagated to other client computers by User D. This attribute of the present invention also permits a user to change his/her vote on a comment and allows the computer system to compensate correctly for that change. Due to this scheme, there will be at most N versions of the same content broadcast at once (but only 1 broadcast per device per content), where N is the number of client computers, in accordance with the Bellman-Ford Algorithm, which proves the stability of the system (Bellman, R. (1958). "*On A Routing Problem*," Quarterly of Applied Mathematics 16:87-90; Ford, L. R., Jr. (1956) "*Network Flow Theory*," Paper P-923. Santa Monica, Calif.: RAND Corporation). Most preferably, in calculating the union of the data, the client computer will weight the data by the proximity of the content-providing client computers, such that votes cast by proximal users will be counted more heavily than votes cast by more distant users.

Alternatively, data race issues may be resolved without requiring and storing unique user identifier codings. In such a scenario, each client computer stores as $N_F$, the number of received favorable votes, and as $N_D$ the number of received disfavorable votes. When "duplicate" versions of a content are received, or when votes regarding such content is received, the user's client computer compares newly received favorable votes with the stored favorable vote tally, and stores the maximum number of favorable votes as $N_F$. The client computer likewise compares newly received disfavorable votes with the stored disfavorable vote tally, and stores the maximum number of disfavorable votes as $N_D$. When the client computer then provides such content to other client computers, it provides such $N_F$ and $N_D$ values as well.

Since a distributed network involves the provision of data among potentially large numbers of client computers, its bandwidth requirements can increase exponentially with the number of client computers and the number of content topics being provided. A further attribute of the computer systems of the present invention are their ability to control such bandwidth requirements. This is preferably accomplished through the formation and use of a "Content Stack." In this regard, a client computer will preferably be limited to providing/re-providing K content per iteration, where K is a positive integer set by the user in light of the processing speed, memory attributes and bandwidth accessibility of his/her client computer. When a new content is received, such content is sorted into the Content Stack by its weighting on the receiving client computer, and, if necessary due to memory or processing constraints, the least valued content of the Content Stack is dropped from client computer's Content Stack. It is preferred that valued content (i.e., content that is presented to the client's user) be stored separately on a user's client computer (e.g., in the client computer's Presentation Stack) so that it will not be erroneously removed. Content that exceeds K content per iteration may be provided to other client computers, if bandwidth is not limited. Preferably such additional content will be provided only if bandwidth and/or processing capacity are not limiting for, so as to promote dynamic interactions among client computers, rather than a "Twitter®"-like, serial interaction (Twitter, Inc.). The Content Stack differs from the Presentation Stack (described below) in size (typically holding more topics than is presented to the user in the Presentation Stack), and content (typically holding content established by the Network, for example in accordance with the Network's General Terms of Service (or in the case of a Restricted Network, in accordance with the Restricted Network's Terms of Service) terms of service, whereas the Presentation Stack holds content in accordance with client computer preferences). The Content Stack will preferably store 50, 100, 200, 500, 1000, 5000 or more contents.

In a preferred embodiment, the client computers of a computer system of the present invention will store received content in their respective Content Stack memories such that the amount of content (e.g., the number of topics, or the amount of memory allocated to content storage) may vary in response to bandwidth and/or processing capacity. As content fills the Content Stack memory of a client computer, the lowest stack contents are pushed down until they fall out of the stack and are no longer disseminated to the network by that client computer.

A received content is initially ordered in the Content Stack memory of a receiving client computer based upon its "Favorability Value," (see, e.g., Bardala, V. et al. (2010) "*A Novel Learning Based Solution For Efficient Data Transport In Heterogeneous Wireless Networks*," Wireless Networks 16(6):1777-1798; Ramana, B. V. et al. (2008) "*A Novel Learning Based Solution for Efficient Data Transport in Heterogeneous Wireless Network*," High Performance Computing—HiPC 2008 Lecture Notes in Computer Science 5374:402-414; Bellavista, P. et al. (2007) "*Context-Aware Handoff Middleware For Transparent Service Continuity In Wireless Networks*," Pervasive and Mobile Computing 3(4):439-466) with content having a higher Favorability Value placed above content having a lower Favorability Value.

The Favorability Value of content according to the present invention is determined by a "Favorability Function" ("$F_{Favorability}$"), which is a function of a set of Favorability Parameter Functions relating to "Favorability Parameters" that the network has elected to consider as relevant to the Favorability Value. Thus, the Favorability Value of a content (e.g., Content N) is determined from the Favorability Function's consideration of client-selected or network-selected Favorability Parameters relating to such content:

$$F_{Favorability_{Content\,N}} = f \begin{cases} f_{1^{st}\,Favorability\,Parameter}(1^{st}\,\text{Favorability Parameter}) \\ f_{2^{nd}\,Favorability\,Parameter}(2^{nd}\,\text{Favorability Parameter}) \\ f_{3^{rd}\,Favorability\,Parameter}(3^{rd}\,\text{Favorability Parameter}) \\ \vdots \\ f_{4^{th}\,Favorability\,Parameter}(4^{th}\,\text{Favorability Parameter}) \end{cases}$$

The Favorability Function may be static, or may be updated. Such updates may be in real-time to address network flow and capacity constraints.

Examples of Favorability Parameter Functions include:

$f_{vote}$ a function of the Favorability Parameter: vote, that weights the number of favorable/disfavorable votes that a content has received; for example, such a function might increase in value as the relative number of favorable votes for a content increases;

$f_{dissemination}$ a function of the Favorability Parameter: dissemination, that weights the extent of the content's dissemination across the network (e.g., the number of hops made by such content); for example, such a function might increase in value as the extent of such content's dissemination increases;

$f_{distance}$ a function of the Favorability Parameter: distance, that weights the distance between the content originator and the receiving client computer; for example, such a function might decrease in value as the distance between the content originator and the receiving client computer increases;

$f_{hop\text{-}distance}$ a function of the Favorability Parameter: hop-distance, that weights the distance between the client computer providing such content and the receiving client computer; for example, such a function might increase in value as the distance between the content originator and the receiving client computer decreases;

$f_{time}$ a function of the Favorability Parameter: time, that weights the time interval between the time at which the content was originated and the time at which such content is received by the receiving client computer; and $f_{premium}$ a function of the Favorability Parameter: premium, that weights the premium enhanced favorability that content may acquire from commercial, governmental, social or other weighting factors (for example, corporate sponsorship of a content, advertising, emergency warnings, etc.);

such that an illustrative Favorability Function for a Content N would be:

$$F_{Favorability} = \begin{cases} f_{vote}(\text{Number of Favorable Votes Received by Content } N) \\ f_{dissemination}(\text{Number of Clients Disseminating Content } N) \\ f_{distance}(\text{Distance from Content } N \text{ Origination to Receiving Client Computer}) \\ f_{hop\text{-}distance}(\text{Distance of Hop from Providing Client to Receiving Client Computer}) \\ f_{time}(\text{Time Interval from Content } N \text{ Origination to Time of Receipt by Receiving Client Computer}) \\ f_{premium}(\text{Premium Favorability Enhancement of Content } N) \\ \vdots \\ f_n \end{cases}$$

The Favorability Parameter Functions employed in a Favorability Function may independently be linear, logarithmic, exponential, etc. For example, an $f_{vote}$ function might be applied to a content such that the function's value for such content would increase linearly or exponentially in response to increasing numbers of favorable votes, thereby increasing its dissemination. An $f_{dissemination}$ function might be applied to a content such that the function's value for such content would increase linearly or exponentially in response to the extent of the content's dissemination across the network, but then decrease so as to allow new content to traverse the network. An $f_{distance}$ function might be employed that would apply an inverse linear function, or a negative exponential function, to content, such that the function's value for such content would decrease to reflect the distance between the content originator and a receiving client computer. An $f_{hop\text{-}distance}$ function might be applied to a content such that the function's value for such content could increase linearly or exponentially as the distance between the content originator and the receiving client computer decreases, but then level off or decrease for content having short hop distances or substantially unchanging hop distances. An $f_{time}$ function might be applied to a content such that the function's value for such content would increase, possibly rapidly (e.g., linearly or exponentially), but then level off or decrease over time (e.g., inverse linear, negative exponential, logarithmic, etc., so as to foster the dissemination of new content and the non-dissemination of older content. An $f_{premium}$ function might be applied to a content in order to "outweigh" completely or partially, other Favorability Parameter Functions. As will be recognized, by selection of Favorability Parameters, and Favorability Parameter Functions, the present invention permits the Favorability Function to be set and fine-tuned to address bandwidth and issues of network flow.

Thus, as (or if) a particular content is re-received by a client computer, the position of that content in the Content Stack memory of such client computer may change to reflect the updated Favorability Value of that content on the network. For example, re-received content that is found to have acquired a higher (or lower) Favorability Value but which has had less dissemination can be accorded a higher Content Stack position than such content would have been accorded had it had greater dissemination. The Favorability Function ensures that a content converges (i.e., does not "crisscross" indefinitely (and exponentially) across the network until it consumes all bandwidth). As the extent of its dissemination increases, the function causes the Favorability Value of a content to decrease until it ultimately falls from the Content Stack memory.

Thus, in sum, content stored in Content Stack memory rises in response to increases in the Favorability Value of the content, and falls in the Content Stack memory in response to decreases in its Favorability Value, such that the number or amount of content stored in the Content Stack memory and provided to other client computers of the network remains within available processing and bandwidth parameters. Such parameters may additionally use an $f_{premium}$ Favorability Parameter Function to prioritize (i.e., overweight) content received by a client computer that is provided by sponsors (e.g., commercial sponsorships, advertisements, etc.) or from a Restricted Computer Network, such that such sponsored content or such received Restricted Computer Network content may be preferentially provided to other client computers and thus preferentially disseminated across the distributed network.

Preferably, a client computer of a computer system of the present invention will select from the received content of its Content Stack memory, valued or desired content that is to be presented to the user of that client computer. Such valued or desired content will preferably be stored in the client computer's memory in a "Presentation Stack" memory, such that the amount of content (e.g., the number of topics, or the amount of memory allocated to content storage) is user-controlled and varies in response to user-selected parameters (such as a user's content weightings preferences) and received new content. Content stored in Presentation Stack memory is preferably determined by the proximity between the content-receiving client computer and a content-providing client computer that is providing such content, by the Favorability Value of the content and by the weighting preferences being applied by the content-receiving client computer, such that the number or amount of content stored in the Presentation Stack memory of the client computer remains within user-selected parameters.

Content stored in Presentation Stack memory thus:
(A) rises in the Presentation Stack memory in response to:
  (1) increased proximity between the content-receiving client computer and a content-providing client computer that is providing such content;
  (2) increases in the Favorability Value of the content; and
  (3) changes in the weighting preferences applied by the content-receiving client computer that increase the user's desire for such content; and
(B) falls in the Presentation Stack memory in response to:
  (1) decreased proximity between the content-receiving client computer and a content-providing client computer that is providing such content;
  (2) decreases in the Favorability Value of the content; and
  (3) changes in the weighting preferences applied by the content-receiving client computer that decrease the user's desire for such content;
such that the number or amount of content stored in the Presentation Stack memory of the client computer remains within user-selected parameters.

Most preferably new topics (i.e., topics that were not previously provided to a client computer) comporting with the weighting preferences of the user will be initially placed at the top of the Presentation Stack upon their receipt, pending a user-provided vote to favor or disfavor such content. The Presentation Stack will preferably store the 1, 5, 10, 20, 50, 100, etc. most discussed topics received by the client computer.

Although the Content Stack and Presentation Stack may be separately stored, it is preferable to combine both stacks to form a single memory stack that internally distinguishes presented content from other stored content.

Figure 3A:
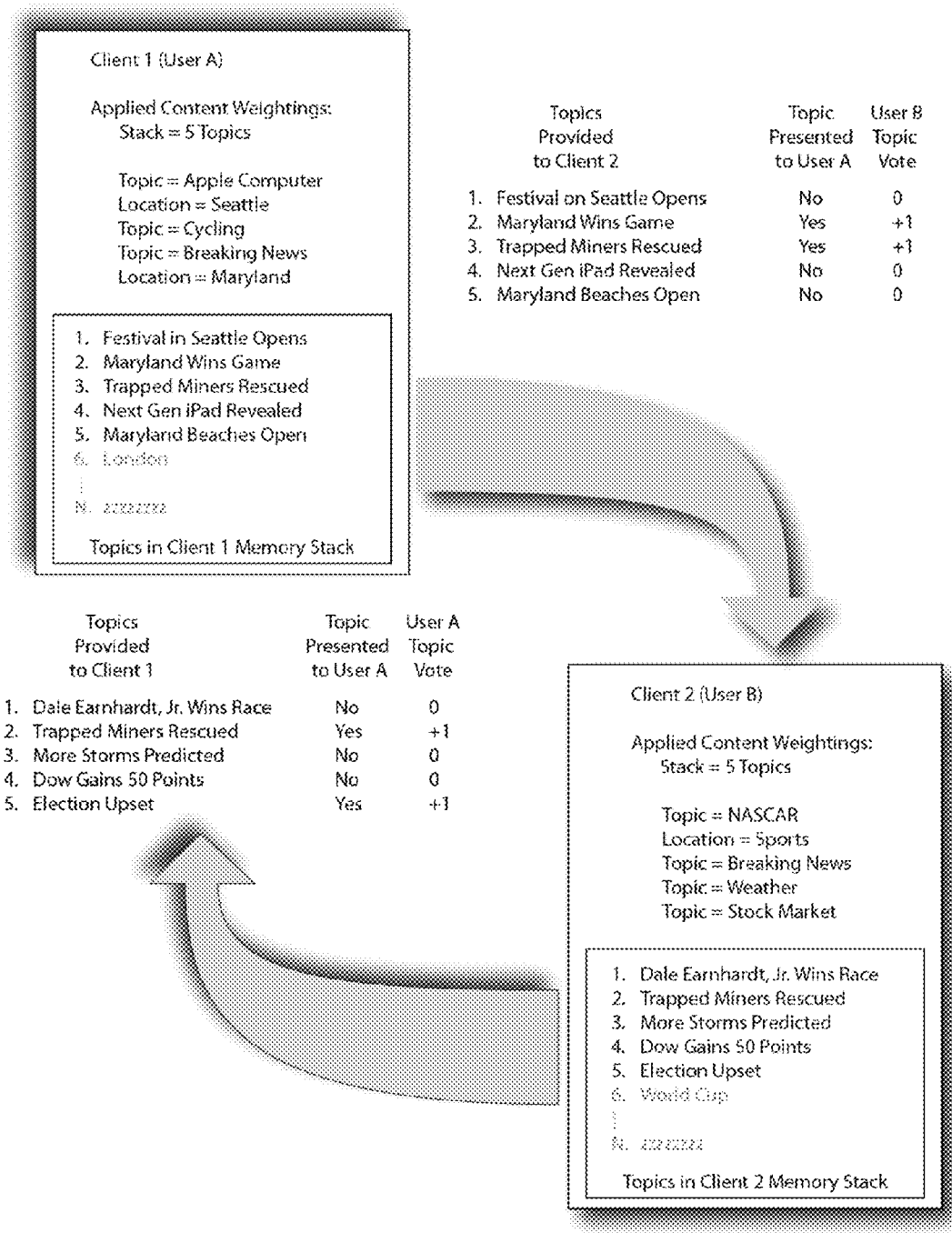
FIGS. 3A-3B illustrate how the memory stacks of two client computers (client computers 1 of User A and client computer 2 of User B) change in response to the sharing of their content.
Figure 3B:
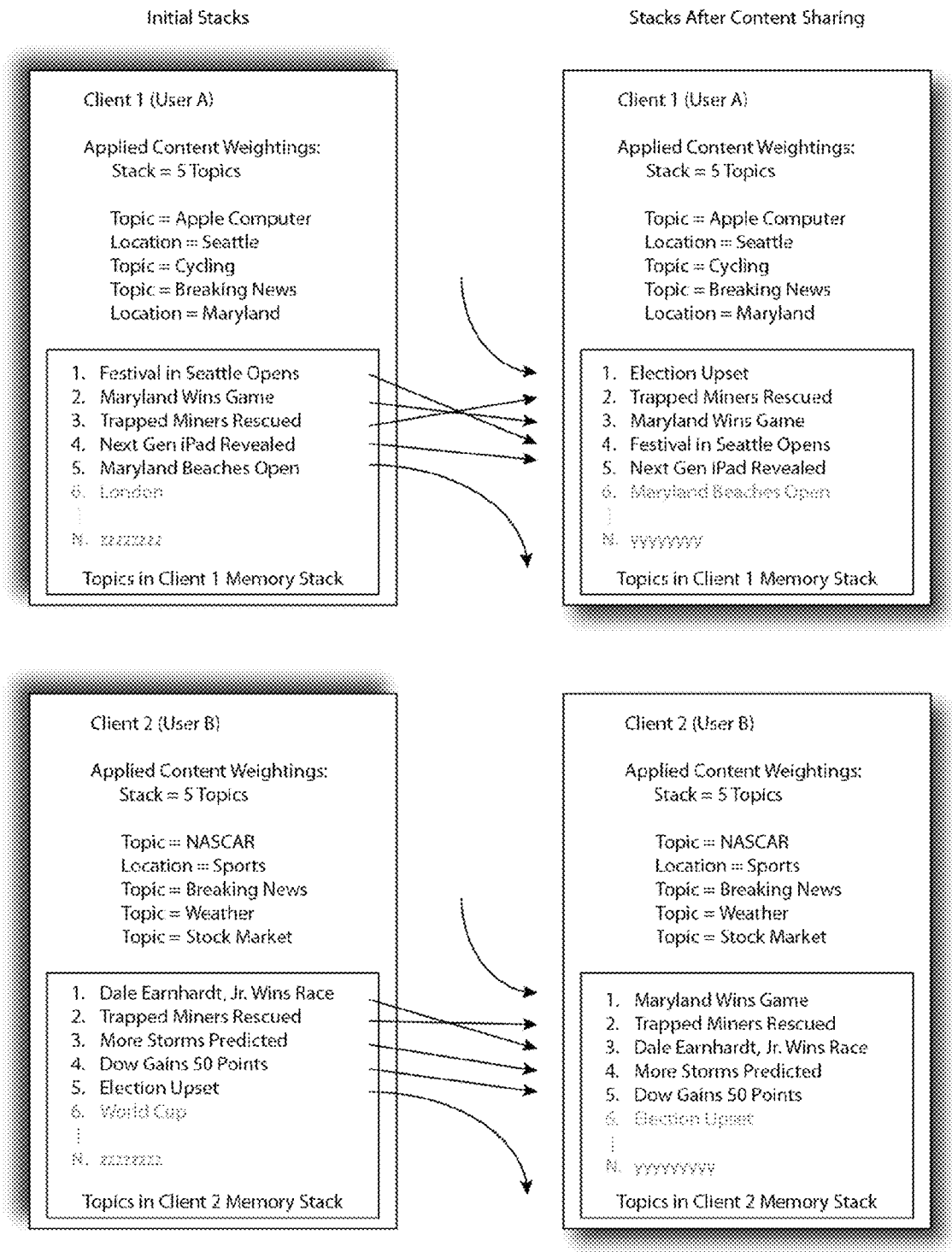

FIGS. 3A-3B illustrate how the memory stacks of two client computers (client computers 1 of User A and client computer 2 of User B) change in response to the sharing of their content. As illustrated in FIG. 3A, both client computers have been instructed to display only 5 topics (i.e., their Presentation Stacks are both set to display only the most valued or desired 5 contents). Content from client computer 1 is provided to client computer 2, but, in accordance with User B's instructions, client computer 2 only presents topics that have been weighted. Non-presented content is preferably stored in client computer 2's memory (shown grayed in FIG. 3A) so that it may be readily presented to User B should User B's weighting preferences change. Likewise, content from client computer 2 is provided to client computer 1, and topics are presented to User A in accordance with User A's weighting preferences, and non-presented content is preferably stored in client computer 1's memory (shown grayed in FIG. 3A) so that it may be readily presented to User A should User A's weighting preferences change. FIG. 3B illustrates how the respective stacks of client computer 1 and client computer 2 are changed by content sharing between them. New content is added to the top of the stack, and existing content is repositioned in the stack, or dropped from the presented content of the stack, reflecting the respective user's weighting preferences.

Each favorable vote received by a particular content enhances its rank-weighting and thus its ability to flow across the network. Likewise, receipt of disfavoring votes diminishes the rank-weighting of the content, and thus decreases its ability to flow across the network. Thus, content having higher favorable votes will flow further than content having higher disfavorable votes. As discussed above, a client computer may be configured to present its user with content pertaining to the 1, 5, 10, 20, 50, 100, etc. most discussed topics received by the client computer. As a particular content receives additional disfavorable votes (or as other content receive additional more favorable votes), such particular content will fall in ranking until it is eventually dropped from the stack of content presented to the user or saved by the client computer.

Preferably, the vote associated with a particular content and the physical distance between a content-providing client computer and a content-receiving client computer will be used in determining whether to present the content to the content-receiving client computer's user. Accordingly, if the distance from the content-providing client computer to the content-receiving client computer is further than the rank-weight of a content, the content may be dropped and not added to the content-receiving client computer's content.

Figure 4A:
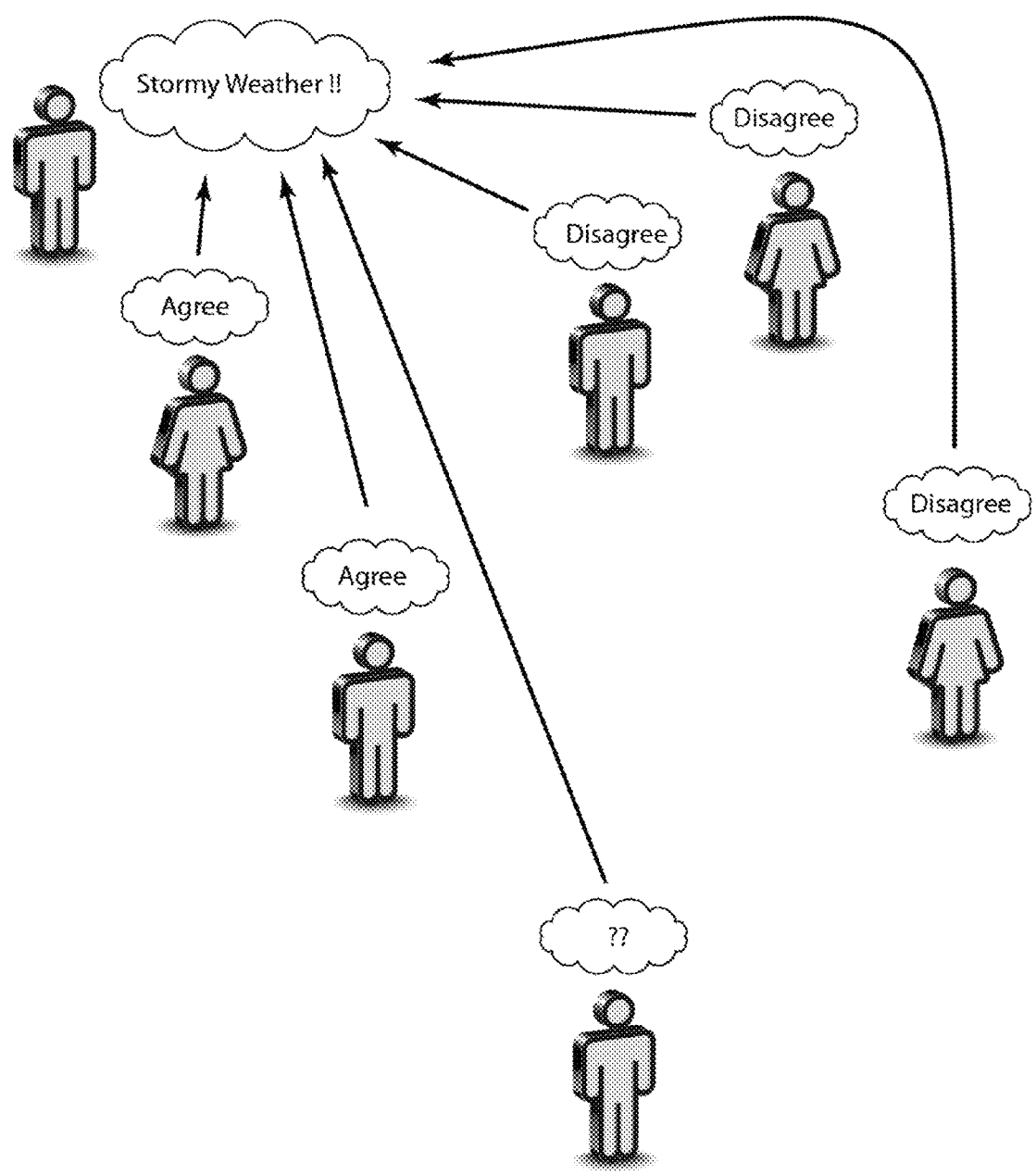
FIGS. 4A-4B illustrate the ability of the present invention to use proximity-weighting.
Figure 4B:
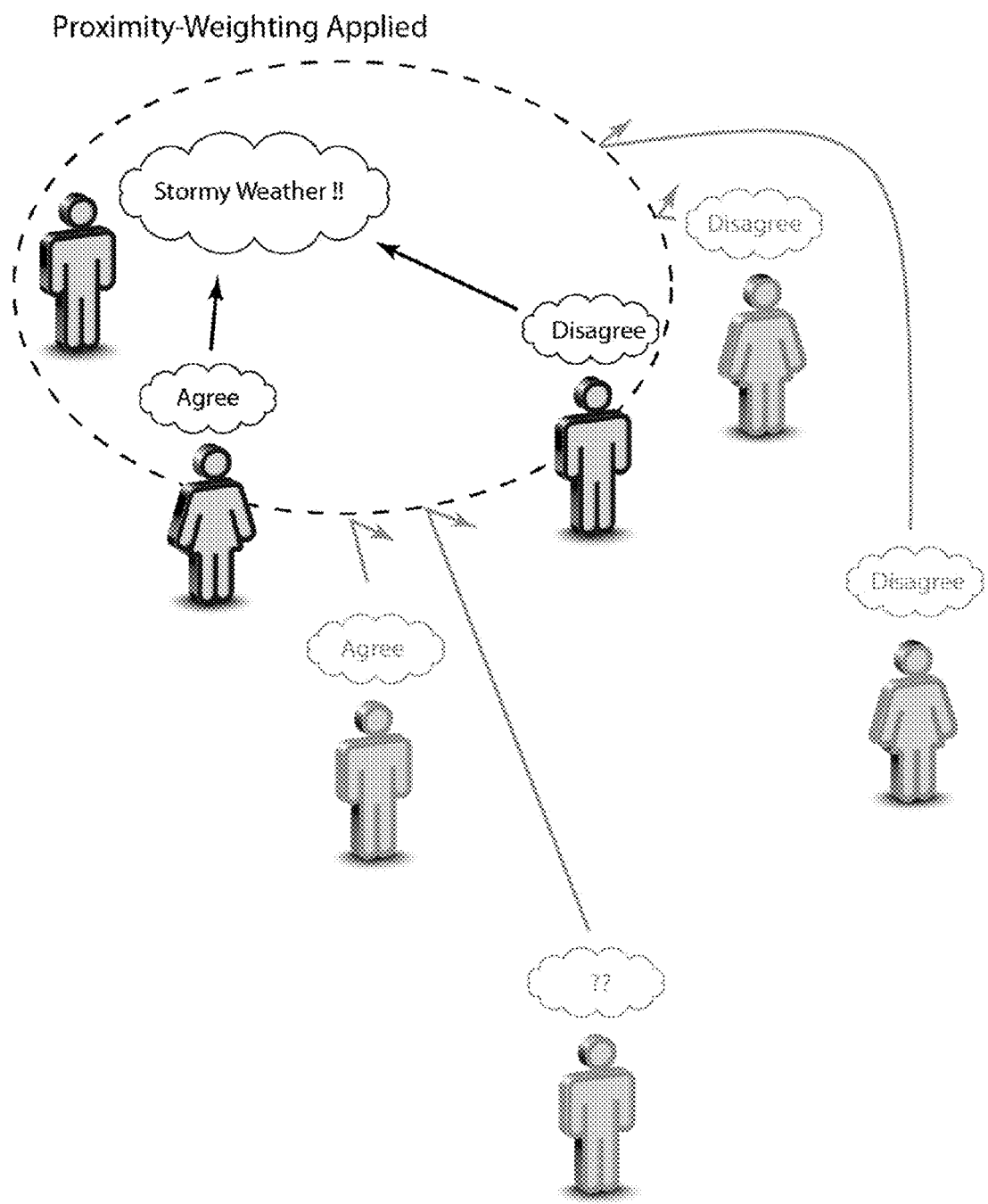

As illustrated in FIG. 4A, content provided by distant users may not be as relevant as content of proximal users. The proximity-weighting attribute of the present invention (discussed below) permits client computers that are positionally located in proximity to one another to exchange and share content, thereby providing a more relevant presentation of content (FIG. 4B).

Any user, however, may use keywords (i.e., query-weighting), such that content relevant to such topics will receive a higher ranking and be retained by the recipient's client computer. For example, if a User A provides content "apple" having a vote of +10 to Users B and C located 10 km away, the content may be dropped by the client computer of User B (and thus not be presented to User B); User B's client computer's stack of content will be adjusted accordingly to present content of higher ranking. However, if User C has set a query-weighting for "apple," then the content will not be dropped by the client computer of User C (and thus will be presented to User C). Thus, the weighting that determines whether received content will be presented/provided to other client computers (or, alternatively, dropped) preferably depends upon the relative locations of the providing and content-receiving client computers and the union of vote data of that content, as calculated by the content-receiving client computer, taking into account any user-provided topic-weighting or query-weighting instructions. The ability of a particular content to be shared among all members of a network depends upon the ranking of such content, the distance between client computers, and the ranking of other content that may be provided to a recipient client computer. Thus, whereas the computer systems of the present invention have the ability to distribute a particular content to all client computers of the network, the systems (and/or individual client computers thereof) also possess the ability to limit the distribution of content in accordance with user-selected or system-determined weighting option(s).

B. Operation of a Preferred Non-Distributed Computer Systems of the Present Invention The computer systems of the present invention may be established as a non-distributed computer system, such as a centralized or regionalized computer system. In such an embodiment, individual client computers provide a central or regional server with their respective user identifier coding, client computer identifier coding, positional location and weighting preferences. Content, and any votes relating to such content, are provided to the server, which then establishes a centralized database capable of being accessed by individual client computers and of presenting to such client computers received content that has been weighted according to each such client computer's respective proximity and other weighting preferences.

The use of a non-distributed computer system eliminates the possibility of a data race, but entails interconnectivity (and preferably, real-time interconnectivity) between individual client computers and a remote, and possibly distant, server.

IV. Open Computer Networks and Restricted Computer Networks

The distributed or non-distributed networks of the present invention may be configured as a single Open Computer Network or as comprising one, two, three or more Restricted Computer Network(s). The computer network of the present invention may alternatively be configured to comprise both a single Open Computer Network and also such one, two, three or more Restricted Computer Network(s).

As used herein, an "Open Computer Network" is one that any client computer in communication range will be eligible to join, either automatically, or more preferably, upon the request of the entering client and subject to its user's agreement to General Terms Of Service. As used herein, terms of service are said to be "General Terms Of Service" if they are not specific to particular users but are required of all users within communication range. Such General Terms Of Service could include, for examples, restrictions on the provision of copyrighted materials, agreement to permit other clients to copy received content and provide such content to additional clients, restrictions on use, restrictions on the nature of content that may be provided, etc.)

In contrast, a "Restricted Computer Network" is one in which any client computer in communication range will be eligible to join, either automatically, or more preferably, upon the request of the entering client, subject to agreement to Restricted Computer Network Terms Of Service. As used herein, terms of service are said to be "Restricted Computer Network Terms Of Service" if they are specific to a particular Restricted Computer Network. For example, such Restricted Computer Network Terms Of Service may require confidentiality or require the provision of authentication credential(s) (e.g., a password (textual, image, tonal, digital key, etc.) or biometric credential (such as a fingerprint, face recognition match, DNA match, palm print, hand geometry match, iris recognition match, retinal pattern match, odor/scent match, typing rhythm, gait, voice pitch/accent, voice recognition pattern, etc.) that is selected by and associated with such Restricted Computer Network.

Preferably, although only those clients that have been authenticated and accepted to a Restricted Computer Network will be able to receive content provided by other clients of the Restricted Computer Network, all clients within communication range of such an accepted client will be able to provide content to clients of the Restricted Computer Network. Thus, both authenticated and non-authenticated clients assist in disseminating Restricted Computer Network content among the authenticated clients of the Restricted Computer Network, even though such content would not be perceivable by the users of the non-authenticated clients. Less preferably, only Restricted Computer Network authenticated clients will be able to provide such Restricted Computer Network content to other authenticated clients.

Clients of a Restricted Computer Network may provide and receive "encrypted" content, which may then be decrypted by other clients of the Restricted Computer Network. For example, content may be encrypted using an AES (128, 192, or 256 bit), a Triple DES (2-key or 3-key), a CASTS (80 or 128 bit) encryption algorithm, etc. and an associated encryption key (e.g., an RSA key, a Diffie-Hellman key, an MQV key, a key produced through an Elliptic Curve algorithm, etc.), which is possessed by clients of such Restricted Computer Network. Alternatively, a Restricted Computer Network may provide and receive non-encrypted content.

When the computer system of the present invention comprises more than one network, the selection of which network is to be used by a content-providing client computer may be established by the client computer's user, or may be established by the General Terms Of Service (for an Open Computer Network) or the such Restricted Computer Network Terms Of Service (for one or more Restricted Computer Networks). Alternatively, network selection may be determined heuristically based upon a user's prior network selection(s). Alternatively, content received from a particular joined network will automatically configure the receiving client to provide responding content using the same network, whether open or restricted, unless changed by the client's user.

Preferably, however, a client that has joined an Open Computer Network and one or more of such additional Restricted Computer Networks will provide its user with the option of providing content on any of such joined networks via, for example via the use of a "Network Selection Signal" (NSS). The Network Selection Signal may be an actual button, switch, slide, etc., or may be a screen icon of such a button, switch, slide, etc., or other signal or indication recognized by the client computer. The Network Selection Signal may alternatively be configured as a client computer orientation, a client computer movement (e.g., a "shaking" movement), a voice command, a sound, light or an image recognition etc.). Preferably the employed Network Selection Signal will allow users to easily, rapidly and assuredly select a desired network for providing content to others. Preferably, the client will provide its user with a feedback signal or other indication indicating which network is to be employed for content provision.

Whereas the provision of the Open Computer Networks of the present invention has particular utility in social media and proximity-based mass communication, the provision of the Restricted Computer Networks of the present invention, particularly if configured as a distributed computer network, has particular utility in enhancing the coordination and security of police, firefighters and other emergency responders. For example, a Restricted Computer Network that is available to first responders at an emergency site allows police, firefighters and other emergency personnel to communicate with one another without being tethered to a centralized server. Instead, network content would "hop" from one responder's client computer to another responder's client computer. Thus, the effective communication range would extend from the on-site command and control center to the most distant of the responders (see, FIG. 1). Moreover, since access to the content is restricted to authenticated client computers, information communicated between responders would be secure and confidential. Additionally, because the preferred computer network will also comprise an Open Computer Network, first responders will be able to communicate with civilians and victims, separately from any communications with other first responders. An exemplary set of communications among the first responders relating to a fire scene is shown below in Table 1. In Table 1, the firefighters have client computers that are joined to the open ("O") network (thereby enabling their users to communicate with victims and non-emergency response personnel whose client computers are also joined to the open ("O") network. Additionally, the firefighters are joined to a restricted "Fire Responders" ("FR") network. The Restricted Computer Network Terms Of Service of the FR network defaults provided content to the FR network and require firefighters to provide a Network Selection Signal ("NSS") in order to provide content to another network. Thus, as shown in Table 1, firefighters provide an NSS of "O" in order to provide content over the Open Computer Network. The general network terms of service of the open (O) network presumes that content is to be provided over the Open Computer Network and thus does not require any NSS signaling of the network to be employed. The content shown in Table 1 is shown as textual for ease of representation, but may be audio, image, video, etc., as discussed above.

The use of the Restricted Computer Network of the present invention, particularly if configured as a distributed computer network, likewise has particular utility in enhancing the coordination and security of soldiers and other military personnel engaged in military operations. The distributed configuration of the network permits its range to extend from the most advanced soldier to that soldier's command and control center. Content provided to the Restricted Computer Network is immediately provided to all client computers that have joined the Restricted Computer Network, thus facilitating communication between soldiers and soldiers and their command centers. As discussed above, the present invention contemplates computer networks that comprise multiple Restricted Computer Networks. Thus, it is possible to share information with only a subset of a force (e.g., officers, advance troops, corpsmen, supply teams, intra-squad, between nearby squads, global watchers, etc.).

TABLE 1

| Msg | Ntwk | Content Provider | NSS | Provided Content | Content Receivers |
|---|---|---|---|---|---|
| 1 | R | Fire Team 1 | None Needed | "Fire is spreading to the third floor! Bring more hoses!" | All first responders, but no others |
| 2 | O | Fire Team 1 | O | "Is anyone trapped in here?" | All first responders, and all others |
| 3 | O | Victim 1 | None Needed | "Help me! I'm John. I'm on the third floor!" | All first responders, and all others |
| 4 | R | Command Center | None Needed | "Fire Team 1, we are sending additional personnel to help John. Stay where you are and fight the fire." | All first responders, but no others |
| 5 | R | Fire Team 1 | None Needed | "Acknowledged; we will fight the fire from here." | All first responders, but no others |
| 6 | O | Fire Team 1 | O | "John, stay where you are. Help is on the way." | All first responders, and all others |
| 7 | O | Victim 1 | None Needed | "OK" | |
| 8 | R | Fire Team 2 | None Needed | "We have John. He is injured. We will evacuate him. Have an ambulance standing by!" | All first responders, but no others |

Msg denotes Message Number
Ntwk denotes Network.
R denotes content provided/received on a Restricted Computer Network.
O denotes content provided/received on an Open Computer Network.

Significantly, due to the ability of the individual client computers of the first responders to both receive and provide content, Message 1 is relayed from client computer to client computer and is received by the Command Center at substantially the same time as it is provided by Fire Team 1. Additionally, Message 3 is received from Victim 1 at the Command Center automatically, and at substantially the same time as it is received by Fire Team 1. Thus, information regarding Victim 1 is received at the Command Center without any active intervention by Fire Team 1. The decision to delay the rescue of Victim 1 until Fire Team 2 is in position (Message 4) may reflect the existence of other victims or extenuating circumstances having higher priority. In order to prevent panic and to allow the firefighters to more effectively triage the emergency response, Message 4 is therefore provided over the Restricted Computer Network and is thus not perceivable by Victim 1. All first responders simultaneously learn of the successful rescue of Victim 1 through Message 7.

The use of the Restricted Computer Network of the present invention, particularly if configured as a distributed computer network, similarly has particular utility in enhancing the coordination and security of private businesses. The distributed configuration of the network permits its range to extend across the entire facility of a business. Content provided to the Restricted Computer Network is immediately provided to all client computers have joined the Restricted Computer Network, thus facilitating communication between individuals having shared responsibilities. As discussed above, the present invention contemplates computer networks that comprise multiple Restricted Computer Networks. Thus, it is possible to share information with only a subset of a business' personnel (e.g., management, shipping, sales, security, etc.).

V. Content Weighting and the Presentation of Weighted Content

As discussed above, the distributed or non-distributed networks of the present invention serve to disseminate content among client computers that are joined to such networks. One aspect of the present invention relates to the ability of the client computers to restrict and/or filter received content in order to present to its user content that is weighted according to the user's preferences. Thus, for example, the client computer may be directed to present content that is proximity-weighted, rank-weighted, topic-weighted, time-weighted, query-weighted, vote-weighted, and/or location-weighted. Any combination of such weightings may be employed.

As used herein, the term "proximity-weighted" is intended to denote that a client is to "weight" (i.e., filter, order, array, etc.) the content that is to be presented to such client's user so that it is ranked according to the proximity of the content-providing client to the locational position of the content-receiving client. Thus, for example, a client applying proximity-weighting to received content would present its user with content about topics being discussed within 5 meters of the content-receiving client's location, within 10 meters of the content-receiving client's location, within 25 meters of the content-receiving client's location, within 50 meters of the content-receiving client's location, within 100 meters of the content-receiving client's location, within 250 meters of the content-receiving client's location, within 500 meters of the content-receiving client's location, within 1 kilometer of the content-receiving client's location, within 5 kilometers of the content-receiving client's location, within 10 kilometers of the content-receiving client's location, within 25 kilometers of the content-receiving client's location, within 50 kilometers of the content-receiving client's location, within 100 kilometers of the content-receiving client's location, or within a larger distance from the content-receiving client's location. A user of such proximity-weighting would then be able to perceive the most frequently commented topics within his/her vicinity.

As used herein, the term "rank-weighted" is intended to denote that a client is to weight the content that is to be presented to such client's user so that it is ranked according to the amount of related content (relative to all content) received by the client. Thus, for example, a client applying rank-weighting to received content would present its user with content pertaining to the 1, 5, 10, 20, 50, 100, etc. most discussed topics received by the client. A user of such rank-weighting would then be able to perceive the most frequently commented topics provided to the client.

As used herein, the term "topic-weighted" is intended to denote that a client is to weight the content that is to be presented to such client's user so that it is ranked according to content "topic" (e.g., a name, event, subject, person, occurrence, etc.). Thus, for example, a client applying topic-weighting to received content would present its user with related content for an alphabetically sorted list of topics received by the client. A user of such topic-weighting would then be able to perceive content relevant to one or more particular topics of interest.

As used herein, the term "query-weighted" is intended to denote that a client is to weight the content that is to be presented to such client's user so that it is ranked according to its perceived relevance to search terms (keywords) provided by the user. Thus, for example, a client applying a query-weighting to received content would present its user with content pertaining to a particular interest of the user (e.g., a name, event, subject, person, occurrence, etc.). A user of such query-weighting would then be able to perceive content relevant to particular topics satisfying the query. A single query or multiple queries may be simultaneously applied. Multiple queries may be applied disjunctively (e.g., "weather" or "Seattle") or conjunctively (e.g., "weather" and "Seattle"). Queries may employ Boolean connectors (e.g., and, not, or, near, when, where, etc.). Thus, whereas topic-weighting presents a user with a list of topics received by the user's client, query-weighting presents a user with a list of topics of particular relevance to such user.

As used herein, the term "time-weighted" is intended to denote that a client is to weight the content that is to be presented to such client's user so that it is ranked according to its recency. Thus, for example, a client applying time-weighting to received content would present its user with related content for a list of the 1, 5, 10, 20, 50, 100, etc. most recent topics provided to the client, or topics arising within the most recent 10 minutes, 30 minutes, hour, day, week, month, year, etc. A user of such time-weighting would then be able to perceive the most recent content presented to the client.

As used herein, the term "location-weighted" is intended to denote that a client is to weight the content that is to be presented to such client's user so that it is ranked according to a user-selected place or location. Thus, for example, a client applying a location-weighting to received content would present its user with content pertaining to a particular area, such as a college or university campus, a neighborhood, an event locale (e.g., an amusement park, a fair, a cruise ship, a conference, etc.), a city, a state, a country, a sub-continental region (e.g., Northern Europe, the Middle East, etc.), or a continent. A user of such location-weighting would then be able to perceive content involving such location.

As used herein, the term "vote-weighted" is intended to denote that a client is to weight the content that is to be presented to such client's user so that it is ranked according to the percentage of favorable votes received (relative to all received votes) that such content has received from other users whose clients have previously received such content and whose users have voted their responses or reactions to such content. Thus, for example, a client applying vote-weighting to received content would present its user with content that had received a vote of greater than 50% favorable votes, greater than 60% favorable votes, greater than 70% favorable votes, greater than 80% favorable votes, greater than 90% favorable votes, greater than 95% favorable votes, etc. A user of such vote-weighting would then be able to perceive the most liked commented topics provided to the client.

Each of such weightings may be applied solely, so as to present a user with content that is only proximity-weighted, only rank-weighted, only topic-weighted, only time-weighted, only query-weighted, only vote-weighted, or only location-weighted (for example to provide a client with the most proximal 1, 2, 5, 10, 20, 50, 100, etc. topics, irrespective of their ranking, topic, recency or location). More preferably, at the request of a user, a client may be directed to simultaneously apply any 2, any 3, any 4, any 5, any 6 or all 7 of such weightings, so as to present the user with related content that is:

A. proximity-weighted and rank-weighted; or proximity-weighted and topic-weighted; or proximity-weighted and time-weighted; or proximity-weighted and query-weighted; or proximity-weighted and vote-weighted; or proximity-weighted and location-weighted; or rank-weighted and topic-weighted; or rank-weighted and time-weighted; or rank-weighted and query-weighted; or rank-weighted and vote-weighted; or rank-weighted and location-weighted; or topic-weighted and time-weighted; or topic-weighted and query-weighted; or topic-weighted and vote-weighted; or topic-weighted and location-weighted; or time-weighted and query-weighted; or time-weighted and vote-weighted; or time-weighted and location-weighted; or query-weighted and vote-weighted; or query-weighted and location-weighted; or vote-weighted and location-weighted; or B. proximity-weighted and rank-weighted and topic-weighted; or proximity-weighted and rank-weighted and time-weighted; or proximity-weighted and rank-weighted and query-weighted; or proximity-weighted and rank-weighted and vote-weighted; or proximity-weighted and rank-weighted and location-weighted; or proximity-weighted and topic-weighted and time-weighted; or proximity-weighted and topic-weighted and query-weighted; or proximity-weighted and topic-weighted and vote-weighted; or proximity-weighted and topic-weighted and location-weighted; or proximity-weighted and time-weighted and query-weighted; or proximity-weighted and time-weighted and vote-weighted; or proximity-weighted and time-weighted and location-weighted; or proximity-weighted and query-weighted and vote-weighted; or proximity-weighted and query-weighted and location-weighted; or proximity-weighted and vote-weighted and location-weighted; or rank-weighted and topic-weighted and time-weighted; or rank-weighted and topic-weighted and query-weighted; or rank-weighted and topic-weighted and vote-weighted; or rank-weighted and topic-weighted and location-weighted; or rank-weighted and time-weighted and query-weighted; or rank-weighted and time-weighted and vote-weighted; or rank-weighted and time-weighted and location-weighted; or rank-weighted and query-weighted and vote-weighted; or rank-weighted and query-weighted and location-weighted; or rank-weighted and vote-weighted and location-weighted; or topic-weighted and time-weighted and query-weighted; or topic-weighted and time-weighted and vote-weighted; or topic-weighted and time-weighted and location-weighted; or topic-weighted and query-weighted and vote-weighted; or topic-weighted and query-weighted and location-weighted; or topic-weighted and vote-weighted and location-weighted; or time-weighted and query-weighted and vote-weighted; or time-weighted and query-weighted and location-weighted; or time-weighted and vote-weighted and location-weighted; or query-weighted and vote-weighted and location-weighted; or C. proximity-weighted and rank-weighted and topic-weighted and time-weighted; or proximity-weighted and rank-weighted and topic-weighted and query-weighted; or proximity-weighted and rank-weighted and topic-weighted and vote-weighted; or proximity-weighted and rank-weighted and topic-weighted and location-weighted; or proximity-weighted and rank-weighted and time-weighted and query-weighted; or proximity-weighted and rank-weighted and time-weighted and vote-weighted; or proximity-weighted and rank-weighted and time-weighted and location-weighted; or proximity-weighted and rank-weighted and query-weighted and vote-weighted; or proximity-weighted and rank-weighted and query-weighted and location-weighted; or proximity-weighted and rank-weighted and vote-weighted and location-weighted; or proximity-weighted and topic-weighted and time-weighted and query-weighted; or proximity-weighted and topic-weighted and time-weighted and vote-weighted; or proximity-weighted and topic-weighted and time-weighted and location-weighted; or proximity-weighted and topic-weighted and query-weighted and vote-weighted; or proximity-weighted and topic-weighted and query-weighted and location-weighted; or proximity-weighted and topic-weighted and vote-weighted and location-weighted; or proximity-weighted and time-weighted and query-weighted and vote-weighted; or proximity-weighted and time-weighted and query-weighted and location-weighted; or proximity-weighted and time-weighted and vote-weighted and location-weighted; or proximity-weighted and query-weighted and vote-weighted and location-weighted; or rank-weighted and topic-weighted and time-weighted and query-weighted; or rank-weighted and topic-weighted and time-weighted and vote-weighted; or rank-weighted and topic-weighted and time-weighted and location-weighted; or rank-weighted and topic-weighted and query-weighted and vote-weighted; or rank-weighted and topic-weighted and query-weighted and location-weighted; or rank-weighted and topic-weighted and vote-weighted and location-weighted; or rank-weighted and time-weighted and query-weighted and vote-weighted; or rank-weighted and time-weighted and query-weighted and location-weighted; or rank-weighted and time-weighted and vote-weighted and location-weighted; or rank-weighted and query-weighted and vote-weighted and location-weighted; or topic-weighted and time-weighted and query-weighted and vote-weighted; or topic-weighted and time-weighted and query-weighted and location-weighted; or topic-weighted and time-weighted and vote-weighted and location-weighted; or topic-weighted and query-weighted and vote-weighted and location-weighted; or time-weighted and query-weighted and vote-weighted and location-weighted; or D. proximity-weighted and rank-weighted and topic-weighted and time-weighted and query-weighted; or proximity-weighted and rank-weighted and topic-weighted and time-weighted and vote-weighted; or proximity-weighted and rank-weighted and topic-weighted and time-weighted and location-weighted; or proximity-weighted and rank-weighted and topic-weighted and query-weighted and vote-weighted; or proximity-weighted and rank-weighted and topic-weighted and query-weighted and location-weighted; or proximity-weighted and rank-weighted and topic-weighted and vote-weighted and location-weighted; or proximity-weighted and rank-weighted and time-weighted and query-weighted and vote-weighted; or proximity-weighted and rank-weighted and time-weighted and query-weighted and location-weighted; or proximity-weighted and rank-weighted and time-weighted and vote-weighted and location-weighted; or proximity-weighted and rank-weighted and query-weighted and vote-weighted and location-weighted; or proximity-weighted and topic-weighted and time-weighted and query-weighted and vote-weighted; or proximity-weighted and topic-weighted and time-weighted and query-weighted and location-weighted; or proximity-weighted and topic-weighted and time-weighted and vote-weighted and location-weighted; or proximity-weighted and topic-weighted and query-weighted and vote-weighted and location-weighted; or proximity-weighted and time-weighted and query-weighted and vote-weighted and location-weighted; or rank-weighted and topic-weighted and time-weighted and query-weighted and vote-weighted; or rank-weighted and topic-weighted and time-weighted and query-weighted and location-weighted; or rank-weighted and topic-weighted and time-weighted and vote-weighted and location-weighted; or rank-weighted and topic-weighted and query-weighted and vote-weighted and location-weighted; or rank-weighted and time-weighted and query-weighted and vote-weighted and location-weighted; or topic-weighted and time-weighted and query-weighted and vote-weighted and location-weighted; or E. proximity-weighted and rank-weighted and topic-weighted and time-weighted and query-weighted and vote-weighted; or proximity-weighted and rank-weighted and topic-weighted and time-weighted and query-weighted and location-weighted; or proximity-weighted and rank-weighted and topic-weighted and time-weighted and vote-weighted and location-weighted; or proximity-weighted and rank-weighted and topic-weighted and query-weighted and vote-weighted and location-weighted; or proximity-weighted and rank-weighted and time-weighted and query-weighted and vote-weighted and location-weighted; or proximity-weighted and topic-weighted and time-weighted and query-weighted and vote-weighted and location-weighted; or rank-weighted and topic-weighted and time-weighted and query-weighted and vote-weighted and location-weighted; or F. proximity-weighted and rank-weighted and topic-weighted and time-weighted and query-weighted and vote-weighted and location-weighted.

By simultaneously applying multiple weightings, a client can, for example, present to its user related content of the top 1, 2, 5 10, etc. topics being discussed in a room (currently or at a prior user-selected time), or the current (or prior) topics of interest trending in a particular city, etc. Thus, for example, the invention permits attendees of a conference to share content related to topics arising at the conference, or permits individuals interested in being aware of news affecting a region area to be able to determine the most important or latest topics pertaining to such region. The architecture and configuration of the computer system permits the top trending topics to vary as attendees move around the conference, consistent with local variation in the topic rankings. Similarly, individuals concerned about a weather or traffic event may communicate with one another using the present invention.

The client computer will preferably permit its user to respond to content provided by other users, so as to permit a content "conversation." The client will also preferably permit a user to register a vote as to whether such user approves, agrees, "likes," etc. such content or disapproves, disagrees, or "dislikes" such content. Such voting facilitates the ability of a computer system of the present invention to establish rank-weighting rankings, time-weighting rankings, etc. The client will preferably permit a user to respond to such votes, on an individualized or global manner, so as to permit a voting user to view additional information (such as the user's name. username, etc.). Thus, for example, a user posting content anonymously may receive a vote of approval from another user, and respond by permitting the approving user to learn the posting user's identity, location, etc. Preferably, such permission may be subsequently augmented or terminated by the posting user.

VI. Content Monitoring Client Computers and Content Flow Analysis ("Data-Mining")

In a preferred embodiment, one or more of the client computers of a computer system of the present invention will be configured as a "Content Monitoring Client Computer" computer. Content Monitoring Client Computers differ from the above-described client computers in being particularly adapted to analyze network content flow relating to one or more particular topics selected by the Content Monitoring Client Computer's user. Content Monitoring Client Computers preferably do not automatically drop from their stacks content of lesser value, but retain such content so that time-based variations of content amount or frequency can be provided. Content Monitoring Client Computers thus have the ability to monitor the flow of content across the network. Content Monitoring Client Computers will preferably have greater processing power and greater memory capacity than other client computers. Content Monitoring Client Computers may be non-mobile devices, such as desktop computers, servers, etc.

As used herein, the term "Content-Selected Monitoring," and variants thereof, are intended to denote the ability of a Content Monitoring Client Computer to discern client computers that are receiving or providing selected content. Preferably, such discernment will be anonymous to the extent that the personal identities (i.e., name, username, etc.) and/or attributes (address, age, credit card information, etc.) of the users of such discerned client computers are not conveyed to, or are not stored by, the Content Monitoring Client Computer. Significantly, the Content Monitoring Client Computer will, however, preferably have the ability to access the user's identifier coding (or the client computer's identifier coding). This attribute facilitates the ability of Content Monitoring Client Computers to categorize users based on the union of topics of interest that they access, and to track changes in the recency, magnitude, excitement, or other attribute(s) or characteristic(s) with which such users interact with one another or with particular products. Thus, the computer systems of the present invention may be operated to provide user(s) of Content Monitoring Client Computers with the ability to perceive the flow of content across the entire network or any sub-region thereof. In combination with query-weighted content presentation requests, such Content Monitoring Client Computers can be used to evaluate the extent to which such selected flow relates to a user-selected attribute (i.e., facilitating "data-mining" of a current content flow). In further combination with a time-weighted content presentation request, and when a log or database of past content has been created, such Content Monitoring Client Computers allow their users to access content that flowed across the network at specified time(s) in the past, or in particular locations, or for specified time period duration(s), which can be used to evaluate the extent to which such selected past flow relates to a user-selected attribute (i.e., "data-mining" a past content flow).

Thus, for example, a Content Monitoring Client Computer that has been instructed to monitor content relating to a particular service, event, location, product, etc. would be able to discern the percentage of client computers on the network that have been instructed to receive or provide content relating to such service, event, location, product, etc. Preferably, the Content Monitoring Client Computer would also be capable of accessing such content so as to permit its user to perceive the favorability/disfavorability, ranking, recency, topics etc. pertaining to such content. Thus, for example, a Content Monitoring Client Computer instructed to monitor content relevant to a selected product (e.g., a fast food product, a television, etc.) or a selected event (e.g., individuals entering an office building, attending a fair, or visiting a museum) would be able to discern, typically anonymously, how many users are commenting about the product or event (in absolute number, or in relative to the total number of client computers of the network, and the reactions of such users to the selected product. A manufacturer, sponsor, administrator, etc. could then use such information to improve or vary the product or alter the event conditions (e.g., re-allocate sales help, address depleting inventory, address over-crowding, etc.) so as to increase the favorability, etc. of the product or event.

An additional attribute of the present invention is that such Content-Selected Monitoring may be cross-correlated with other content to provide the Content Monitoring Client Computer with the ability to discern the demographics of users whose client computers have been instructed to receive or provide the selected content and such other content. Thus, for example, a Content Monitoring Client Computer may be instructed to monitor content regarding a product (i.e., the selected content). Such additional content may be query-specified, and/or may involve one, two or multiple topics. The Content Monitoring Client Computer may then also be instructed to monitor content regarding a particular service, event or location. By then instructing the Content Monitoring Client Computer to compare the identifier codings associated with client computers receiving or providing both such contents, the Content Monitoring Client Computer can discern the number and relative percentage of the intersection of client computers that are receiving or providing content about both the relevant product and such particular service, event or location. As an example, by selecting to monitor "Apple® computer" and then cross-correlating with a proximity of "North Carolina" or "California," one can discern the number or percentage of client computers concerned with Apple® computers in North Carolina or California. By performing such selection repeatedly over time, one can discern how the association varies over time.

The capability of the Content Monitoring Client Computers of the present invention thus differs significantly from those provided by social reviewing networks such as Yelp® or Angie's List®, in being anonymous, automatic, dynamic, and correlatable.

Although Content Monitoring Client Computers are primarily involved in monitoring network content, Content Monitoring Client Computers may also have the ability to provide content to other client computers. For example, a Content Monitoring Client Computer may respond to the monitored content flow by providing inducements to other client computers (e.g., coupons, free additional content, etc.) to motivate users to comment more favorably about a service, event, location, product, etc. Similarly, the operators of the amusement park could use a Content Monitoring Client Computer to provide client computers with information about less crowded areas of the park in order to direct park guests away from more congested park areas.

Figure 5:
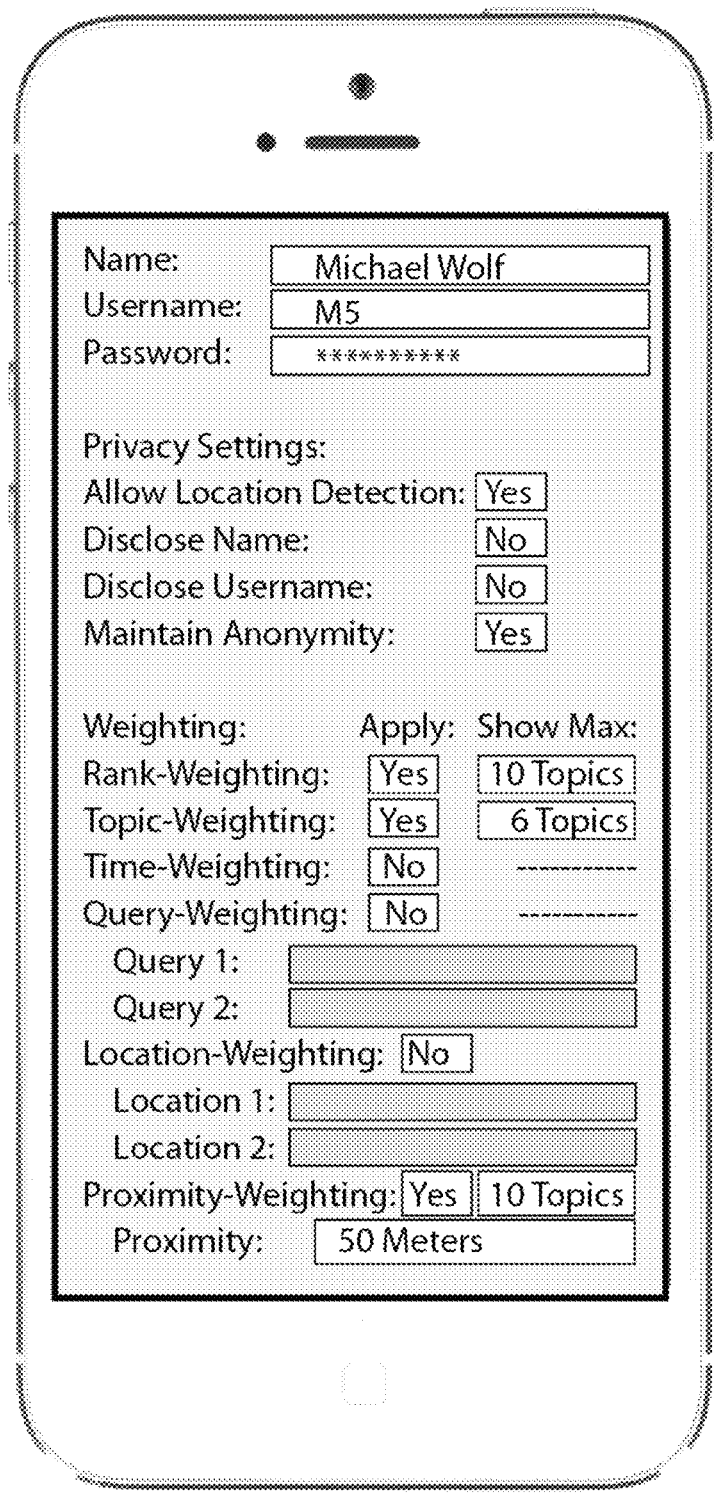
FIG. 5 presents an illustrative text input screen of a touchscreen mobile phone or tablet client computer device.

VII. Exemplary User Interfaces of the Client Computers of the Computer Systems of the Present Invention The client computers of the present invention will preferably present to its user a graphical user interface that will comprise text input boxes sufficient to permit a user to indicate the user's preferences in accessing and using a computer system of the present invention. Such preferences may include, the user's actual name, a selected "username," a selected password, preferences relating to the desired type or types of weighting, and the parameter(s) of such weighting (e.g., the time interval to be used in time-weighting, the distance parameter to be used in proximity-weighting, etc.). Such a text input screen is shown in FIG. 5. Additionally, such preferences may include a user's privacy preferences, such as whether the user's actual name or selected username is to be viewable by other users, or whether such user's content is to be anonymous to other users.

Figure 6:
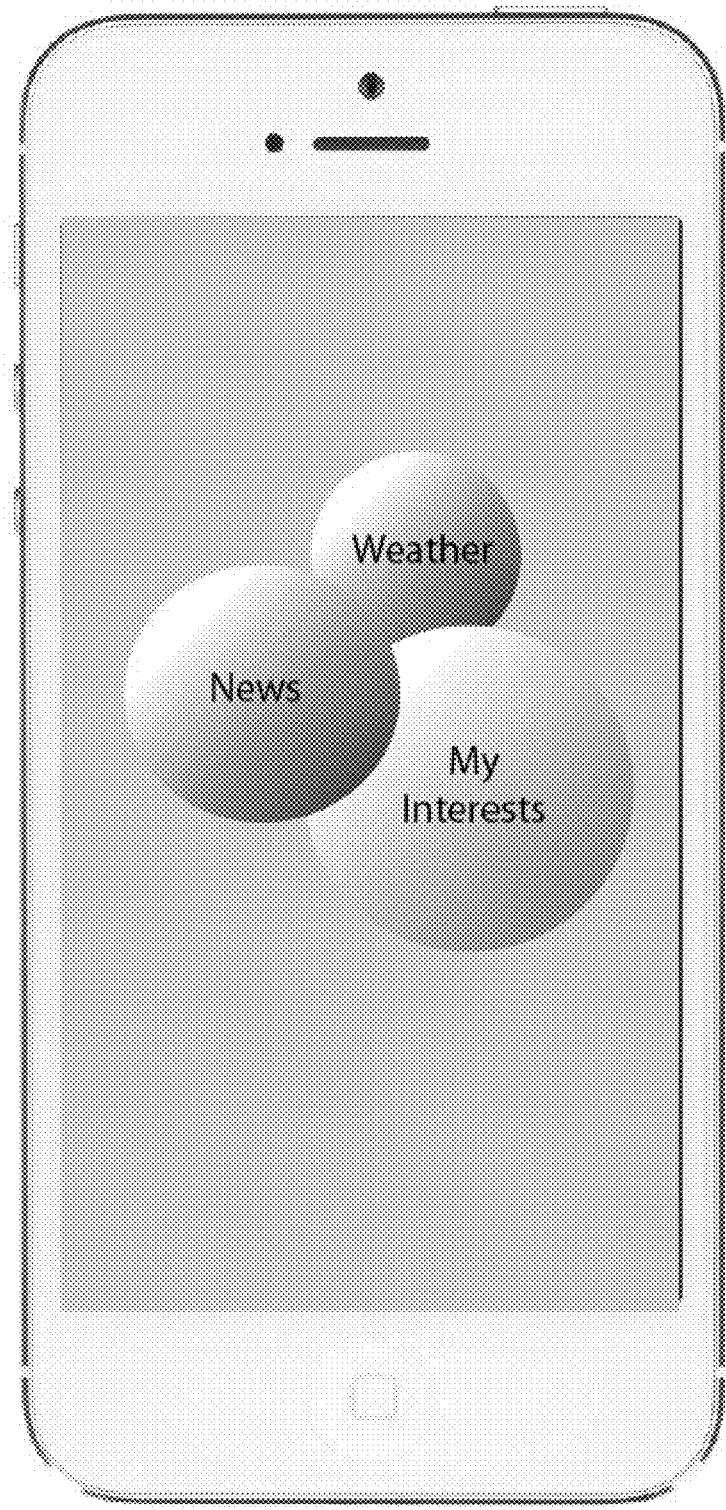
FIG. 6 illustrates a user interface of a touchscreen mobile phone or tablet client computer device.
Figure 7:
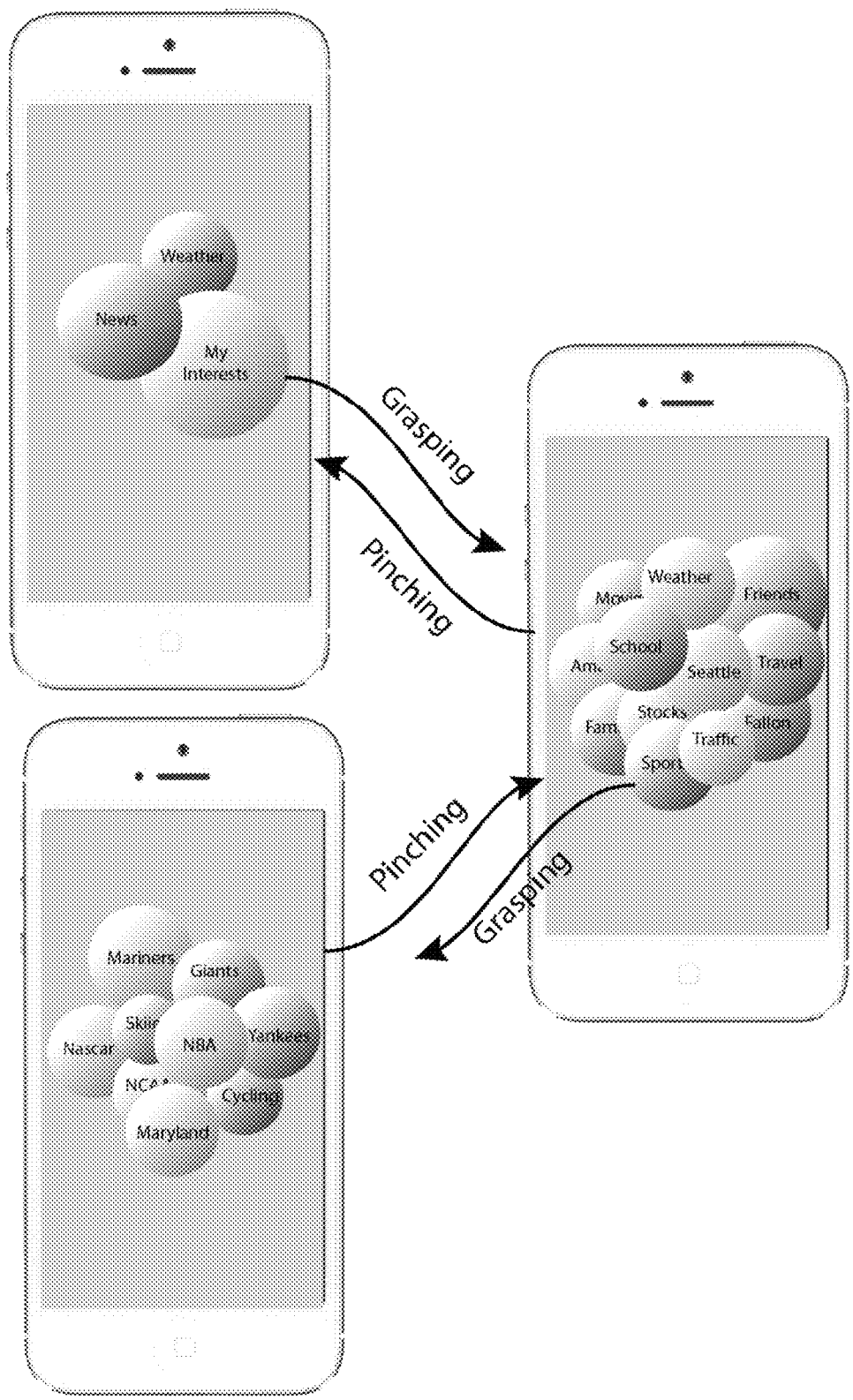
FIG. 7 illustrates the ability of an exemplary user interface to permit a user to perceive desired content.

Any of a wide variety of user interfaces may be employed to permit the user to effectively perceive received content or provide content to other users. Such interfaces may be textual, such as a thread list, but more preferably, an "atomic" user interface is employed, in which the user by "grasping" one or more graphical elements (or selecting such graphical elements) (FIG. 6) of a touch-sensitive, or voice-responsive, screen is able to have the interface "zoom in" to see one or more previously smaller or previously-non-visible graphical elements, denoting a smaller universe of more selected content. Conversely, by "pinching" one or more of the graphical elements (or selecting such graphical elements), the user is able to have the interface "zoom out" to present additional content topics (FIG. 7). Preferably, the interface will permit the user to swipe across the graphical elements to cause them to revolve and thereby bring additional graphic elements into view. The graphical element(s) are preferably sized, colored, labeled, and/or textured, etc. to indicate their relative weighting, such that, for example, if time-weighting is applied, the graphical element associated with a topic of greater recency will be more prominently colored or displayed, etc. It is also preferred that the graphical element(s) are sized, colored, labeled, and/or textured, etc. to indicate the rate of change of a topic relative to such weighting. For example, the graphical elements may be spheres whose diameter reflects the weighting of the content, and whose color reflects the rate of change of that topic relative to such weighting. Alternatively, the thickness of the circular outer boundary of such spheres may vary in proportion to the rate of change of that topic relative to such weighting.

Figure 8:
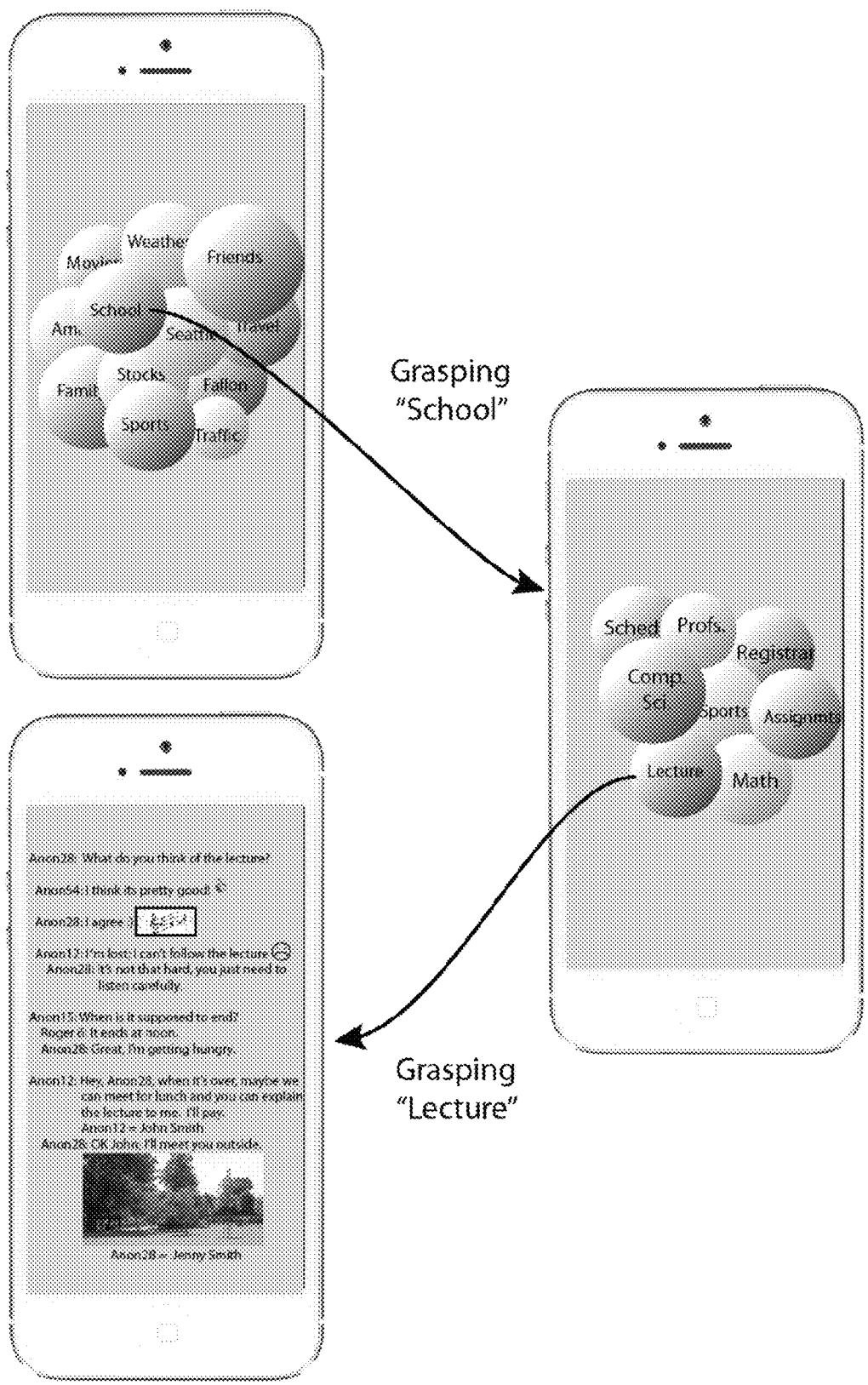
FIG. 8 illustrates how one may manipulate an exemplary user interface to perceive desired content, showing an illustrative topic conversation among several attendees of a lecture.

The interface will additionally preferably permit the user to drag graphical element(s), so that graphical elements representing topics having a user-perceived or user-defined relationship may be adjacent to one another or spaced relative to one another in a manner desired by the user. FIG. 8 illustrates the invention by showing how such zooming may be used to ultimately lead to the presentation of content, and shows an illustrative topic conversation among several attendees of a lecture. Initially the participants are commenting anonymously, however, "Anon28" and "Anon12" eventually reveal their identities to one another. As shown in FIG. 8, users may elect to provide textual content, image content or sound content.

Figure 9A:
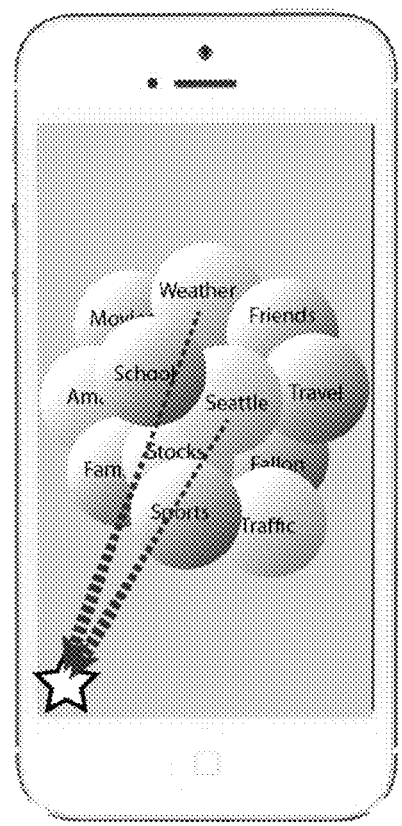
FIGS. 9A-9C illustrate the use of an exemplary user interface of a touchscreen mobile phone or tablet client computer device to sort and group content for presentation to a user.
Figure 9B:
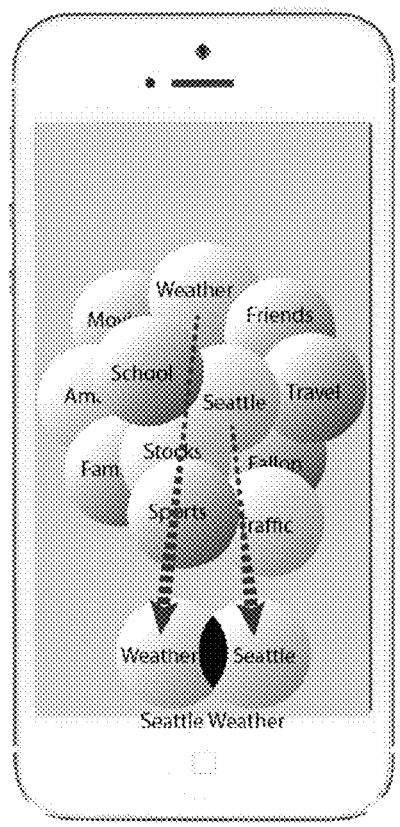
Figure 9C:
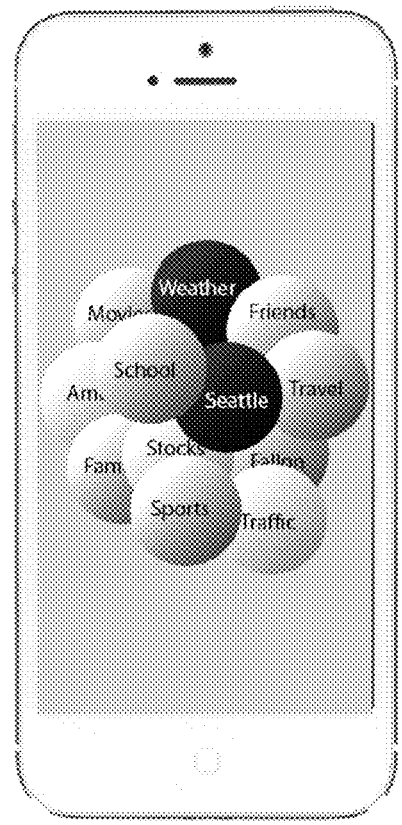

Preferably, the user interface will permit the user to drag graphic elements to be placed onto a sorting graphic element (FIG. 9A) or to overlap with one another (FIG. 9B) so as to permit the user to view related content that relates to two or more topics. Still more preferably, the user interface will permit the user to select graphic elements (which may then change color, or appearance to indicate such selection), to thereby select to view related content that relates to the topics of the selected graphical elements (FIG. 9C). Thus, the graphical element labeled "Seattle," as shown in FIGS. 9A-9C, includes multiple topics all of which relate in some manner to Seattle, and the graphical element labeled "Weather," in FIGS. 9A-9C includes multiple topics all of which relate in some manner to weather anywhere. However, by dragging the "Seattle" and "Weather" graphical elements to a sorting graphical element (shown as a star) a user may select to view content involving the weather in Seattle (FIG. 9A). Alternatively, a user may drag one graphic element (e.g., the "Seattle" graphical element) so that it overlaps with another graphic element (e.g., the "Weather" graphical element) to access content relating to weather in Seattle (FIG. 9B). Alternatively, the user may "select" the graphical elements of interest (e.g., by touching such graphical elements). The interface then preferably alters the appearance of the selected elements to indicate their selection, and provides the user with content relating to topics involving the selected graphical elements (e.g., Seattle weather; FIG. 9C).

Particularly in conjunction with location-weighting, the user interface may comprise a map (such as a "heat map") having graphical element(s) that are sized, colored, labeled, and/or textured, etc. to indicate their relative weighting. Thus, for example, a client computer presenting a time-weighted map of an amusement park would present its user with a gradient of the currently most crowded areas of the park. FIG. 10A illustrates this aspect of the present invention, showing Town Square and Future Land as being the most crowded sections of an amusement park. A user might then elect to visit other, less crowded areas of the park. The user might then direct his/her client computer to present a rank-weighted map of the amusement park, and thus be able to perceive a gradient of the areas of the park currently spurring the most discussion. FIG. 10B illustrates this aspect of the present invention, showing that something interesting is happening in the Magic Land and Adventure Place sections of the park. The operators of the amusement park could use a Content Monitoring Client Computer to assess how such "heat maps" of park traffic are changing over time, and thus be able to better allocate park resources so as to alleviate congestion or foster improved traffic flow. Preferably, such heat map changes are provided to the user of the Content Monitoring Client Computer in real time (e.g., as a pseudo-video formed from rapidly updating static heat map images, or as a continuous video of traffic flow, etc.).

Figure 11:
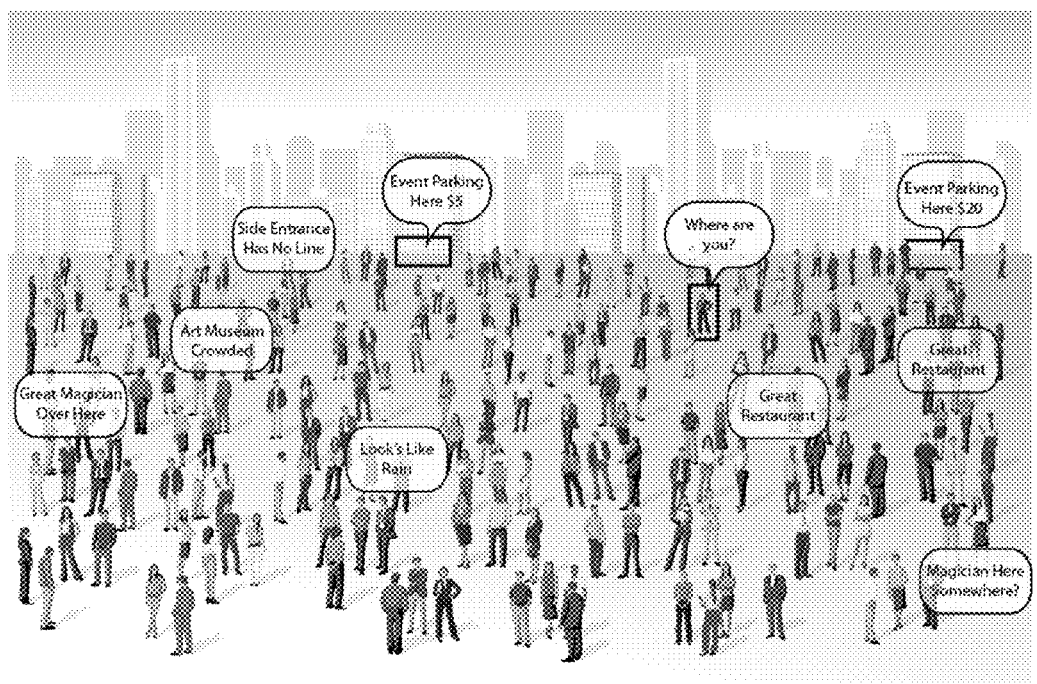
FIG. 11 shows a user interface that exploits a camera functionality of a client computer. Content is shown in balloons, which are generally localized (so as to preserve the anonymity of the content provider in the absence of permission), or in callouts that are particularly localized to client computers whose users have granted identification permissions to the recipient.

The user interface may exploit a camera or other optical image input, if such is present on the client computer device. For example, the user interface may use the camera of a camera-containing client computer to associate content with a particular location, orientation or user. Thus, the user interface will appear to be an image of the surroundings that comprises one or more annotations relating to the location or orientation of a content provider and the nature of the provided content (FIG. 11). Client computers of users that have provided permission to a receiving client computer may be specifically localized on the user interface, so as to be personally identified. Conversely, client computers of users that have not granted such permission will preferably be localized only to an area, so as to remain anonymous to the receiving client computer.

The user interface will preferably notate users having multiple approving votes with a symbol (e.g., a star, thumbs up, etc.) denoting such approval. The user interface may additionally notate users having multiple disapproving votes with a symbol denoting such disapproval.

All publications and patents mentioned in this specification are herein incorporated by reference to the same extent as if each individual publication or patent application was specifically and individually indicated to be incorporated by reference in its entirety. While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A computer system for disseminating content among interconnected client computers, wherein said computer system comprises three or more client computers digitally interconnected with one another to form a distributed communications network, wherein,
   (A) each of said interconnected client computers comprises: a means for inputting data, a means for receiving content provided by another client computer, a means for providing content to another client computer, a means for presenting content to a user, a computer-addressable memory for storing content and programming instructions and a processor for processing data and for implementing said programming instructions;
   (B) said client computers are interconnected to one another directly or through one or more other client computers; and
   (C) each of said interconnected client computers receives content from and/or provides content to another of said interconnected client computers, wherein said provided content adjusts in response to changes in Favorability Value assigned by interconnected client content-providing computers and in response to a Favorability Value assigned to such content by interconnected client content-receiving computers, thereby disseminating such content across said distributed network; wherein said Favorability Value is determined by a Favorability Function that considers one or more client-selected or network-selected Favorability Parameter(s); with the proviso that when said selected Favorability Parameters include both vote and time, the Favorability Function shall additionally consider one or more additional Favorability Parameter(s).

2. The computer system of claim 1, wherein a client computer of said computer system stores received content in a Content Stack memory; wherein content stored in said Content Stack memory rises in response to increases in Favorability Value of the content, and falls in the Content Stack memory in response to decreases in Favorability Value, such that the number or amount of content stored in the Content Stack memory and provided to other client computers of the network remains within available processing and bandwidth parameters.

3. The computer system of claim 2, wherein said client computer of said computer system presents a subset of said stored content to its user, wherein said presented content is stored in a Presentation Stack memory; wherein content stored in said Presentation Stack memory:
   (A) rises in the Presentation Stack memory in response to:
      (1) increased proximity between the content-receiving client computer and a content-providing client computer that is providing such content;
      (2) increases in the Favorability Value of the content; and
      (3) changes in the weighting preferences applied by the content-receiving client computer that increase the user's desire for such content; and
   (B) falls in the Presentation Stack memory in response to:
      (1) decreased proximity between the content-receiving client computer and a content-providing client computer that is providing such content;
      (2) decreases in the Favorability Value of the content; and
      (3) changes in the weighting preferences applied by the content-receiving client computer that decrease the user's desire for such content;
   such that the number or amount of content stored in the Presentation Stack memory of the client computer remains within user-selected parameters.

4. The computer system of claim 3, wherein said presented content is weighted based on one or more weightings selected from the group consisting of: rank-weighting, topic-weighting, time-weighing, query-weighting, vote-weighting and location-weighting.

5. The computer system of claim 1, wherein said client-selected or network-selected Favorability Parameter(s) comprise one or more of the Favorability Parameters: dissemination, distance, hop-distance and premium.

6. The computer system of claim 1, wherein said client-selected or network-selected Favorability Parameters comprise two or more of the Favorability Parameters: vote, dissemination, distance, hop-distance and premium.

7. The computer system of claim 6, wherein a client computer of said computer system votes to favor or disfavor a received content, or provides related content, and provides said vote or said related content to another client computer.

8. The computer system of 1, wherein said client-selected or network-selected Favorability Parameters comprise two or more of the Favorability Parameters: dissemination, distance, hop-distance, time and premium.

9. The computer system of claim 1, wherein said network additionally comprises a Content Monitoring Client Computer.

10. The computer system of claim 1, wherein said network comprises a Restricted Computer Network.

11. The computer system of claim 1, wherein said means for presenting content to a user comprises a graphical user interface.

12. A computer-implemented method for disseminating content among interconnected client computers, wherein said method:
  (A) enables the digital interconnection of three or more client computers to form a distributed communications network, wherein,
    (1) each of said interconnected client computers comprises: a means for inputting data, a means for receiving content provided by another client computer, a means for providing content to another client computer, a means for presenting content to a user, a computer-addressable memory for storing content and programming instructions, and a processor for processing data and for implementing said programming instructions;
    (2) wherein said client computers of said distributed communications network are interconnected to one another directly or through one or more other client computers, so that content received from, and/or provided to, one of said interconnected client computers is provided to another interconnected client computer of said distributed network, wherein said provided content adjusts in response to changes in Favorability Value assigned by interconnected client content-providing computers and in response to a Favorability Value assigned to such content by interconnected client content-receiving computers; wherein said Favorability Value is determined by a Favorability Function that considers one or more client-selected or network-selected Favorability Parameter(s); with the proviso that when said selected Favorability Parameters include both vote and time, the Favorability Function shall additionally consider one or more additional Favorability Parameter(s); and
  (B) permits a client computer of said distributed communications network to provide content to another of said interconnected client computers, and permits said distributed communications network to disseminate such content across said network.

13. The computer-implemented method of claim 12, wherein said method permits a client computer of said computer system to store received content in a Content Stack memory; wherein said method permits content stored in said Content Stack memory to rise in response to increases in Favorability Value of the content, and to fall in the Content Stack memory in response to decreases in Favorability Value, such that the number or amount of content stored in the Content Stack memory and provided to other client computers of the network remains within available processing and bandwidth parameters.

14. The computer-implemented method of claim 13, wherein said method permits said client computer of said computer system to present a subset of said stored content to its user, wherein said presented content is stored in a Presentation Stack memory; wherein said method permits content stored in said Presentation Stack memory:
  (A) to rise in the Presentation Stack memory in response to:
    (1) increased proximity between the content-receiving client computer and a content-providing client computer that is providing such content;
    (2) increases in the Favorability Value of the content; and
    (3) changes in the weighting preferences applied by the content-receiving client computer that increase the user's desire for such content; and
  (B) to fall in the Presentation Stack memory in response to:
    (1) decreased proximity between the content-receiving client computer and a content-providing client computer that is providing such content;
    (2) decreases in the Favorability Value of the content; and
    (3) changes in the weighting preferences applied by the content-receiving client computer that decrease the user's desire for such content;
  such that the number or amount of content stored in the Presentation Stack memory of the client computer remains within user-selected parameters.

15. The computer-implemented method of claim 14, wherein said method permits said presented content to be weighted based on one or more weightings selected from the group consisting of: rank-weighting, topic-weighting, time-weighing, query-weighting, vote-weighting and location-weighting.

16. The computer-implemented method of claim 12, wherein said method permits said client-selected or network-selected Favorability Parameters to comprise one or more of the Favorability Parameters: dissemination, distance, hop-distance and premium.

17. The computer-implemented method of claim 12, wherein said method permits said client-selected or network-selected Favorability Parameters to comprise two or more of the Favorability Parameters: vote, dissemination, distance, hop-distance and premium.

18. The computer-implemented method of claim 17, wherein said method permits a client computer of said computer system to:
  (A) (1) vote to favor or disfavor a received content, or
      (2) contribute related content, and
  (B) provide said vote or said related content to another client computer.

19. The computer-implemented method of claim 12, wherein said method permits said client-selected or network-selected Favorability Parameters to comprise two or more of the Favorability Parameters: dissemination, distance, hop-distance, time and premium.

20. The computer-implemented method of claim 12, wherein said method permits said network to additionally comprise a Content Monitoring Client Computer.

21. The computer-implemented method of claim 12, wherein said method permits said network to comprise a Restricted Computer Network.

22. The computer-implemented method of claim 12, wherein said means for presenting content to a user comprises a graphical user interface.

* * * * *

UNITED STATES PATENT AND TRADEMARK OFFICE
CERTIFICATE OF CORRECTION

PATENT NO. : 9,742,853 B2
APPLICATION NO. : 14/512442
DATED : August 22, 2017
INVENTOR(S) : Michael H. Auerbach It is certified that error appears in the above-identified patent and that said Letters Patent is hereby corrected as shown below:

1) At Column 32, Lines 18-19, the phrase "client content-providing computers" should read:
-- content-providing client computers --.

2) At Column 32, Lines 20-21, the phrase "client content-receiving computers" should read:
-- content-receiving client computers --.

3) At Column 33, Lines 52-53, the phrase "client content-providing computers" should read:
-- content-providing client computers --.

4) At Column 33, Line 55, the phrase "client content-receiving computers" should read:
-- content-receiving client computers --.

Signed and Sealed this
Seventh Day of August, 2018

Andrei Iancu
*Director of the United States Patent and Trademark Office*